United States Patent
Shibue et al.

(10) Patent No.: US 6,623,811 B2
(45) Date of Patent: Sep. 23, 2003

(54) OPTICAL FILM AND LIQUID CRYSTAL DISPLAY USING THE SAME

(75) Inventors: Toshiaki Shibue, Hino (JP); Makoto Honda, Hino (JP); Nobuo Kubo, Hino (JP); Noriyasu Kuzuhara, Hino (JP); Hiroki Umeda, Hino (JP); Sota Kawakami, Hino (JP); Takatoshi Yajima, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 10/288,689

(22) Filed: Nov. 5, 2002

(65) Prior Publication Data

US 2003/0129327 A1 Jul. 10, 2003

Related U.S. Application Data

(62) Division of application No. 09/691,310, filed on Oct. 18, 2000, now Pat. No. 6,503,581.

(30) Foreign Application Priority Data

Oct. 21, 1999 (JP) .............................. 11-299901
Nov. 8, 1999 (JP) .............................. 11-316958

(51) Int. Cl.$^7$ ................................ C09K 19/00
(52) U.S. Cl. ........................ 428/1.1; 349/117
(58) Field of Search ................ 349/117–128, 130, 349/101, 84; 428/1.1, 1.2

(56) References Cited

U.S. PATENT DOCUMENTS

| 5,528,400 | A | * | 6/1996 | Arakawa | 359/73 |
| 5,695,694 | A | * | 12/1997 | Iwata et al. | 428/1 |
| 6,139,785 | A | * | 10/2000 | Shuto et al. | 264/207 |
| 6,320,042 | B1 | * | 11/2001 | Mishihata et al. | 428/1 |
| 6,330,108 | B1 | * | 12/2001 | Nishikouji et al. | 359/497 |
| 6,503,581 | B1 | * | 1/2003 | Shibue et al. | 428/1.1 |

* cited by examiner

Primary Examiner—Mark F. Huff
Assistant Examiner—Jennifer R. Sadula
(74) Attorney, Agent, or Firm—Muserlian, Lucas and Mercanti

(57) ABSTRACT

A film for a liquid crystal display comprising a fatty acid cellulose ester film having an acetyl group and a propionyl group is disclosed. Sum of degree of acetyl substitution (DSac) and degree of propionyl substitution (DSpr) of the fatty acid cellulose ester film of the film is 2.8 or less, and a retardation value (Rt value) in the thickness direction defined by Formula 1 is 60 to 300 nm.

27 Claims, 1 Drawing Sheet

OPTICAL FILM AND LIQUID CRYSTAL DISPLAY USING THE SAME

CROSS REFERENCE TO RELATED APPLICATION

This Application is a Divisional of U.S. patent application Ser. No. 09/691,310 filed Oct. 18, 2000, now U.S. Pat. No. 6,503,581.

FIELD OF THE INVENTION

The invention relates to such a film employed in a liquid crystal display as a protective film, view angle enlarging film, an optically anisotropic film such as a phase difference film, a polarizing plate employing film, and a liquid crystal display.

A liquid crystal display operates at low voltage as well as low power consumption, and further, can be directly connected to an IC circuit. Specifically, it is possible to decrease its thickness. As a result, it is widely employed in word processors, personal computers, and the like, as the display. The basic structure of said liquid crystal display is such that polarizing plates are provided on the both sides of the liquid crystal cell.

In such liquid crystal displays, from the viewpoint of contrast and the like, those employing a twisted nematic liquid crystal (TN), having a twist angle of 90 degrees, have been replaced with those employing super twisted nematic liquid crystal (STN) having a twist angle of at least 160 degrees.

However, liquid crystal displays, employing STN, utilize double refraction or birefringence of the liquid crystal. As a result, the following problems which are tinted blue or yellow have occurred. Viewing angle decreases, and it is difficult to produce acceptable color images in TN.

In order to overcome these problems, that is, to compensate for adverse effects due to double refraction, a technique has been proposed in which a phase difference plate is provided under the aforementioned polarizing plate. By employing this technique, the aforementioned tint problem is overcome. However, the viewing angle problem is largely unsolved. Further, a technique has been proposed in which a double refraction film is prepared in which the refractive index in the thickness direction of said film is greater than that in the vertical direction against the optical axis of double refraction, and the resultant film is employed as the phase difference plate. Still further, a technique has been proposed in which one plate having a positive double refraction value and the other plate having a negative refraction value are employed as the phase difference plate, or a multilayer exhibiting such properties is employed as the phase difference plate. Still further, as shown in Japanese Patent Publication Open to Public Inspection No. 7-218724, a polarizing plate is proposed in which at least one of its protective films is a plastic film comprised of acetyl cellulose, having the retardation value of 30 to 70 nm in the in-plane direction when measured employing light having a wavelength of 590 nm.

As methods to overcome these problems, various types of proposals have been made. For example, Japanese Patent Publication Open to Public Inspection No. 63-149624 proposes an F-STN system employing a stretched resin film, and Japanese Patent Publication Open to Public Inspection Nos. 3-87720 as well as 4-333019 proposes a method to carry out color compensation employing a film in which molecules of a liquid crystallizing polymer are subjected to twisted orientation for the purpose of decreasing its weight as well as its wall thickness while maintaining the compensation performance of a D-STN system. The phase deference compensation board of said liquid crystal display is comprised of a transparent base board, an oriented layer formed on said base board, and a liquid crystal polymer layer which is fixed in a twisted orientation state on said oriented layer.

Further, currently, as disclosed in Japanese Patent Publication Open to Public Inspection No. 7-191217, trials to improve the viewing angle of a liquid crystal cell have been carried out as compensation of the viewing angle of a TFT and TN liquid crystal display in such a manner that a discotic liquid crystal film is provided on the upper and lower surfaces of a liquid crystal cell. Said compensation board for the TN type liquid crystal display is comprised of a transparent base board, an alignment layer formed on said base board, and a liquid crystal alignment layer formed on said alignment layer in the same manner as the phase difference compensation board of the liquid crystal display described in the aforementioned Japanese Patent Publication Open to Public Inspection Nos. 3-87720 and 4-333019.

As described above, in recent years, in STN liquid crystal displays, and also in TFT and TN liquid crystal displays, demanded is an optical film having more advanced compensation performance than before. As the means to meet said demand, an optical film, on which a liquid crystal compound is coated, has been investigated.

On the other hand, techniques have been developed in which improvement of a crystal mode makes it possible to improve the viewing angle. For example, Japanese Patent Publication Open to Public Inspection No. 2-176625 discloses a liquid crystal display employing the liquid crystal cell of a vertical alignment (VA) liquid crystal mode which orients a liquid crystal compound vertically during non-application of voltage and substantially orients the same horizontally during application of voltage. The vertical alignment (VA) liquid crystal mode is characterized in having a wider viewing angle and higher speed response compared to the conventional liquid crystal mode. The trial sample of the liquid crystal display of the vertical alignment (VA) liquid crystal mode was already exhibited earlier (based on Nikkei Microdevice No.136, page 147, 1996). The liquid crystal display of the vertical alignment (VA) liquid crystal mode exhibits a wider viewing angle than conventional liquid crystal displays. However, when compared to CRTs, further improvement is required. In order to improve the viewing angle, it is considered to employ an optical compensation sheet in the same manner as the conventional liquid crystal mode.

Said VA type liquid crystal display comprises the liquid crystal cell with a vertical alignment orientation mode in which when no voltage is applied, liquid crystal molecules are oriented vertical to the orientation plate, while when voltage is applied, they are oriented parallel to the orientation plate. As a result, in said liquid crystal display, black is displayed as genuine black, contrast increases, and the viewing angle is relatively wider, compared to the TN and STN types. However, in accordance with an increase in size of a liquid crystal screen, an increase in the viewing angle has been increasingly demanded.

In order to increase the viewing angle of said VA system liquid crystal, the present inventors investigated the protective film for a polarizing plate. During the course of the investigation, it was found that in the VA type liquid crystal display, even though a film, which allows to control the retardation value in the in-plane direction as shown in Japanese Patent Publication Open to Public Inspection No. 7-218724, is employed, the resulting effects were low.

Further, Japanese Patent Publication Open to Public Inspection No. 9-90101 proposes that casting can be carried out without using chlorine based hydrocarbons as the solvent, by increasing the solvent selection range through substituting an acetyl group and a propionyl group of the specified range, and also proposes fatty acid cellulose esters having a low retardation value in both in-plane and thickness directions with the purpose such that the high contrast of liquid crystal displays such as the TFT type and FSTN type in which high contrast has been realized, is not degraded.

Consequently, the investigation regarding a protective film for a polarizing plate was further conducted. As a result, it was discovered that when a film was employed in which the retardation value (Rt value in the aforementioned Formula 1) in the thickness direction which was a value showing anisotropy in the in-plane direction as well as in the thickness direction without employing the conventional retardation value in the in-plane direction in the viewing angle of the VA type liquid crystal display increased. Further, investigation was carried out regarding a method to increase the retardation value in the thickness direction. Thus the present invention was realized.

Further, in an optically anisotropic film prepared by providing a liquid crystal layer onto a support having a greater RT value, the inventors of the present invention discovered that advantageous performance was obtained not only in a VA type liquid crystal cell but also in a TN type liquid crystal cell. Still further, at that time, without employing a large amount of costly liquid crystalline compounds as well as without increasing the support thickness, a preferable optically anisotropic film was obtained. Accordingly, it is possible to obtain an optically anisotropic film as a less expensive, smaller and lighter part.

Further, when cellulose ester film is produced by dissolving cellulose ester and casting the resulting solution, any portion which has been subjected to insufficient esterification tends to remain in the film as insoluble foreign matter particles. When the resulting film is employed to produce liquid crystal display elements, it has been found that the insoluble foreign matter particles cause problems such as hindering the formation of a polarizing state and forming abnormal light emission due to its difference in the refractive index from cellulose ester. Further, under normal light condition, it was difficult to detect said abnormality due to the presence of insoluble particles. In recent years, the high precision of liquid crystal displays is progressing and problems due to such foreign matter particles have increasingly been noted.

SUMMARY OF THE INVENTION

An object of the present invention is to provide a film for a liquid crystal display which enables enhancement of viewing angle without increasing the thickness, and provide a polarizing plate as well as a liquid crystal display using the same. Another object of the present invention is to provide a film for a liquid crystal display which minimizes problems due to abnormal light emission, while exhibiting excellent tearing strength as well as excellent water resistance, and a polarizing plate as well as a liquid crystal display using the same. Still another object of the present invention is to provide a film for a liquid crystal display which is less expensive and thinner, while exhibiting high performance optical anisotropy, and a polarizing plate as well as a liquid crystal display using the same.

The present invention and its embodiments will now be described.

The other embodiment of the invention is described.

1. An optical film comprised of a fatty acid cellulose ester film having an acetyl group and a propionyl group, and a retardation value (Rt value) in the thickness direction defined by Formula 1 of 60 to 300 nm.

Formula 1:

$$Rt \text{ value} = [(n_x + n_y)/2 - n_z] \times d$$

wherein $n_x$ represents the refractive index of the film in the direction parallel to the film casting direction, $n_y$ represents the refractive index of the film in the direction vertical to the casting direction, $n_z$ represents the refractive index of the film in the thickness direction, and d (in nm) represent the thickness of the film.

2. The film described in 1. above, having a retardation value in the thickness direction of 90 to 200 nm.
3. The film described in 1. above, having a retardation value in the thickness direction of 100 to 175 nm.
4. The film described in 3. above, having a retardation value (Ro value) in the in-plane direction defined by Formula 2 of no more than 10 nm.

Formula 2:

$$Ro \text{ value} = (n_x - n_y) \times d$$

wherein $n_x$ represents the refractive index of the film in the direction parallel to the film casting direction, $n_y$ represents the refractive index of the film in the direction vertical to the casting direction, and d (in nm) represent the thickness of the film.

5. The film described in any one of 1. through 4. above, having a thickness of 40 to 190 nm.
6. The film described in any one of 1. through 4. above, having a thickness of 60 to 190 nm.
7. The film described in any one of 1. through 4. above, having a thickness of 75 to 190 nm.
8. The film described in 1. or 2. above, which is produced by casting absolution which is prepared by dissolving in an organic solvent fatty acid cellulose esters having a degree (DSac) of acetyl substitution of 1.5 to 2.3 and a degree (DSpr) of propionyl substitution of 0.6 to 1.2.
9. A production method of an optical film in which when the film described in 8. above is produced by casting said solution on a belt or drum, the residual solvent amount is between 5 and 100 percent during peeling the film from said belt or drum.
10. In a production method of the film described in 1. above, a production method of an optical film wherein a solvent in solution, which is employed for casting, comprises a non-chlorine based solvent in an amount of at least 50 percent.
11. In a production method of the film described in 1. above, a production method of an optical film wherein the weight ratio of alcohol based solvent to the total solution, which is employed for casting, is no more than 0.3.
12. The film described in 1. above, which comprises 1 to 20 weight parts of at least one type of plasticizers comprised of phosphoric acid esters, fatty acid esters and phthalic acid esters with respect to 100 weight parts of fatty acid cellulose ester.
13. The film described in 1. above, which comprises 0.005 to 0.3 weight part of fine particles having an average particle diameter of no more than 0.1 m with respect to 100 weight parts of fatty acid cellulose ester.
14. The film described in 1. above, which comprises 0.8 to 2.0 weight parts of a UV absorbers with respect to 100 weight parts of fatty acid cellulose ester.

15. The film described in 1. above, wherein the number foreign matter particles having a size of 5 to 50 μm, which are observed under a polarized light cross Nicole state, is no more than 200 per 250 mm$^2$, and the number of foreign matter particles having a size of at least 50 μm is substantially 0.
16. The film described in 15. above, wherein the number foreign matter particles having a size of 5 to 50 μm, which are observed under a polarized light cross Nicole state, is no more than 200 per 250 mm$^2$.
17. The vertical alignment type liquid crystal display which employs any one of optical films described in 1., 2., 3., 4., 5., 6., 7., 8., 12., 13., 14., 15., and 16. above.

An optically anisotropic film which comprises a fatty acid cellulose film support having an acyl group from 2 to 3 carbon atoms in the same, having thereon at least one liquid crystal orientation film as well as one liquid crystal layer, and further has a relationship represented by formula (I) between the refractive index nx in the x direction in the plane of said cellulose ester film support, the refractive index ny in the y direction, and the refractive index nz in the thickness direction:

Formula (I)

$$(nx+ny)/2-nz>0$$

The aforementioned optically anisotropic film wherein the retardation value (Rt value) represented by formula (II) is between 50 and 300 nm.

Formula (II)

$$[(nx+ny)/2-nx]\times d$$

wherein nx and ny each represent refractive indices in the x direction, and in the y direction in the plane of the cellulose ester film support; nz represents the refractive index of the film in the thickness direction; and d (in nm) represents the film thickness.

The retardation value (Rt value) represented by said formula (II) is preferably between 60 and 250 nm.

The thickness of said optically anisotropic film is preferably between 40 and 150 μm.

It is preferable that the degree of acetyl substitution (DSac) of a fatty acid cellulose ester film is between 1.5 and 2.5, and the degree of propionyl substitution (DSpr) is between 0.6 and 1.2.

When a fatty acid cellulose ester film support is cast on a belt or a drum, said film support is preferably peeled from said belt or drum while exhibiting a residual solvent amount of 5 to 10 percent.

A solution, employed for casting a fatty acid cellulose ester film on a belt or drum, preferably comprises chlorine-free solvents in an amount of at least 50 percent by weight with respect to the entire solvent amount.

It is preferable that a solvent in a solution employed for casting a fatty acid cellulose ester film on a support comprises at least one alcohol-free solvent and the amount of an alcohol based solvent is 30 percent or less with respect to the total solvent amount.

A fatty acid cellulose ester film support preferably comprises at least one plasticizer selected from phosphoric acid ester derivatives, fatty acid ester derivatives, and phthalic acid ester derivatives in an amount of 1 to 20 percent by weight with respect to the fatty acid cellulose ester.

A fatty acid cellulose ester film support preferably comprises fine particles having an average particle diameter of 0.1 μm or less in an amount of 0.005 to 0.3 percent by weight with respect to the fatty acid cellulose.

It is preferable that at least one liquid crystal layer be provided on a transparent film support and the Rt ratio of the liquid crystal layer to the transparent support, which is represented by the Formula 3 described below, is 1.2 or less.

Formula 3

$$Rt\ \text{ratio}=(Rt'/Rt)$$

wherein Rt' represents the retardation value in the thickness direction of the liquid crystal layer, and Rt represents the retardation value in the thickness direction of the transparent support.

Herein, Rt' is represented by the following formula:

$$Rt'=[(nx'+ny')/2-ny']\times d'$$

wherein nx' and ny' each represent refractive indices in the x' direction and the y' direction, in the plane of the liquid crystal layer, while nz' represents the refractive index in the thickness direction of the liquid crystal layer, and d' (in nm) represents the thickness of the liquid crystal layer.

Rt is expressed by the following formula:

$$Rt=[(n_x+n_y)/2-n_z]\times d$$

wherein $n_x$ and $n_y$ each represent refractive indices in the x direction and the y direction in the plane of the transparent support, while $n_z$ represents the refractive index in the thickness direction of the film, and d (in nm) represents the thickness of the film.

The Rt ratio is preferably 0.8 or less.

The Rt ratio of the liquid crystal layer to the fatty acid cellulose ester film support, which is represented by the following Formula 4, is preferably 1.2 or less.

Formula (4)

$$Rt\ \text{ratio}=(Rt'/Rt)$$

wherein Rt' represents the retardation value in the thickness direction of the liquid crystal layer, and Rt represents the retardation value in the thickness direction of the fatty acid cellulose ester film support.

Herein, Rt' is expressed by the following formula:

$$Rt'=[(nx'+ny')/2-nz']\times d'$$

wherein nx' and ny' each represent refractive indices in the x' direction and the y' direction in the plane of the liquid crystal layer, while nz' represents the refractive index in the thickness direction of the liquid crystal layer, and d' (in nm) represents the thickness of the liquid crystal layer.

Rt is expressed by the following formula:

$$Rt=[(nx+ny)/2-nz]\times d$$

wherein nx and ny each represent refractive indices in the x direction and the y direction in the plane of the fatty acid cellulose ester film support, while nz represents the refractive index in the thickness direction of the film, and d (in nm) represents the thickness of the film.

The Rt ratio is preferably 0.8 or less.

One of the uses of said optically anisotropic film is for a viewing angle compensation film for a liquid crystal display.

The liquid crystal mode is preferably either a twist nematic mode or a vertical alignment mode.

It is preferable that a liquid crystalline compound, which constitutes a liquid crystal layer, be a monomer having a chemically reactive group, and after being oriented on an alignment layer, said orientation is fixed while being hardened employing either light or heat.

The example of said liquid crystalline compound is a discotic liquid crystal.

Another example of said liquid crystalline compound is a liquid crystalline polymer.

An optically anisotropic film wherein luminescent points which are observed when two polarizing plates are provided on both surfaces of a cellulose ester film support so as to shield transmission light, the number of said points having a size exceeding 50 $\mu$m is zero per 250 mm$^2$, and the number of said points having a size of 5 to 50 $\mu$m is 200 or less per 250 mm$^2$.

The number of luminescent points having a size of 5 to 50 $\mu$m is preferably 100 or less per 250 mm$^2$.

It is possible to use an optically anisotropic film as a liquid crystal display being provided on both sides of a liquid crystal cell.

DETAILED DESCRIPTION OF THE PREFERABLE EMBODIMENT

Figure 1:
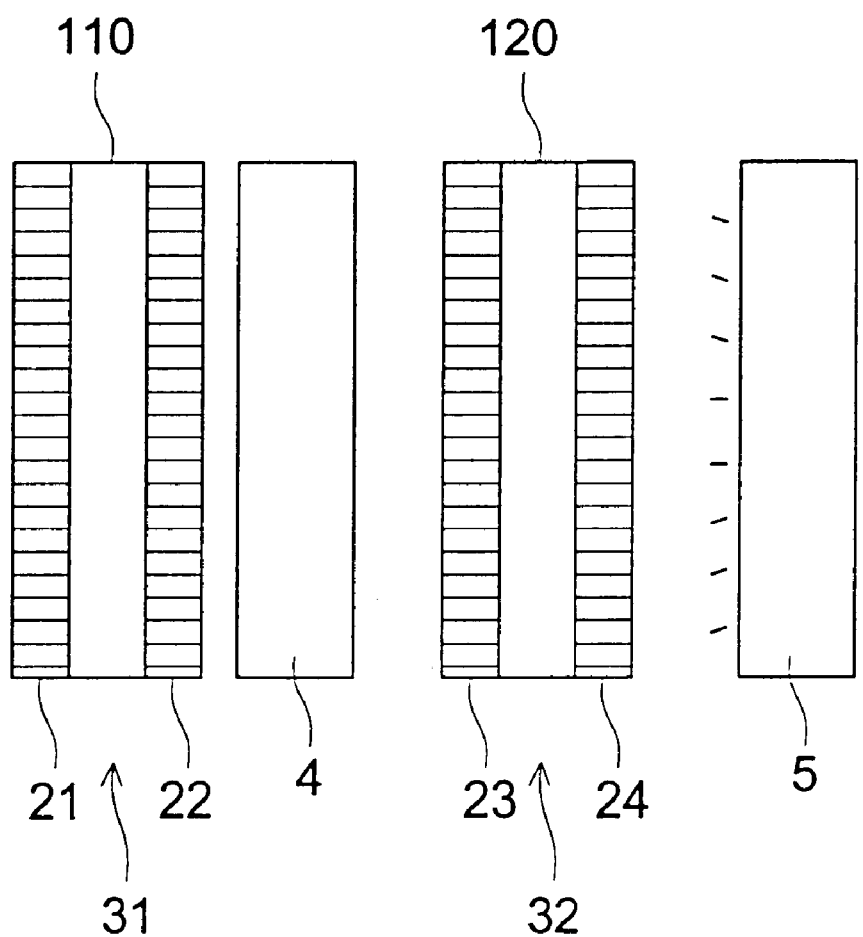
FIG. 1 is a schematic view of a liquid crystal display.

The present invention will now be detailed.

The film for a liquid crystal display of the present invention is comprised of a fatty acid cellulose ester film having an acetyl group and a propionyl group. Listed as films for a liquid crystal display may be optical compensation films such as a protective film for a polarizing plate, a phase difference film, an optically anisotropic film, a viewing angle enhancing film, and the like, as well as films which exhibit combined functions of these films, and the like. The term "fatty acid cellulose ester" means fatty acid ester of cellulose.

Further, the film for a liquid crystal display of the present invention may or may not comprise a liquid crystal layer as well as a liquid crystal alignment layer. The liquid crystal layer is a layer formed by liquid crystal compound. The liquid crystal layer itself may or may not show liquid crystal characteristics. For example, the liquid crystal layer may be formed by polymerizing liquid crystal compound. The alignment of liquid crystal is fixed by chemical reaction caused by function of heat and/or light energy liquid crystal layer. Single molecular liquid crystal compound having.positive refraction index is preferable since it has low viscosity and is easily subjected to alignment of liquid crystal by heat. In particular, liquid crystal compound having ethylenical unsaturated bond may be fixed by hardening through photo-radical reaction by employing photopolymerization initiator.

The film for a liquid crystal display of the present invention, which comprises or does not comprise said liquid crystal layer, may preferably be applied to the vertical alignment (VA) type liquid crystal display. On the other hand, a film comprising the liquid crystal layer may preferably be applied to a twist nematic (TN) type liquid crystal display.

The alignment layer is preferably provided between the liquid crystal layer and the support.

Further, the total substitution degree of the fatty acid cellulose ester film of a film for a liquid crystal display of the present invention is 2.8 or less, preferably 2.1 to 2.8, and more preferably 2.3 to 2.8, in particular 2.5 to 2.75 is preferable. By adjusting the substitution degree to said value, it is possible to obtain a film for a liquid crystal display having excellent optical anisotropy without increasing the film thickness. In addition, the total substitution degree as described herein means the sum of the degree of acetyl substitution (DSac) and the degree of propionyl substitution (DSpr). Further, DSac is preferably between 1.5 and 2.3, and is more preferably between 0.9 and below 2.0. Still further, DSpr is preferably between 0.5 and 1.2, more preferably between 0.6 and 1.2, and in particular preferably between 0.9 and 1.2.

The substitution degree as described herein means the percentage of the amount of a so-called combined fatty acid, and preferably an average number of acyl groups bonding to one glucose unit in cellulose. The Dsac is determined based on the measurement as well as the calculation of acetylation degree in ASTM-D817-91 (Test Method of Cellulose Acetate and the like. DSpr can be determined based on ASTM-D814-96. Further, the retardation value (RT) in the thickness direction of a fatty acid cellulose ester film is a positive value, and is between 60 and 300 nm. Further, it is possible to obtain Rt employing the formula described below:

Formula 1

$$Rt=[(nx+ny)/2-nz]\times d$$

wherein nx represents the refractive index of a cellulose ester film in the maximum refractive index direction in the plane of a fatty acid cellulose ester film; ny represents the refractive index of a fatty acid cellulose ester film in the vertical direction with respect to the nx direction; nz represents the refractive index of a fatty acid cellulose ester film in the thickness direction; and d (in nm) represents the thickness of a fatty acid cellulose ester film.

In addition, nx may be regarded as the refractive index parallel to the casting direction of a fatty acid cellulose ester film. In the same manner, ny may be regarded as the refractive index vertical to the casting direction of said film.

Further, Rt is preferably between 90 and 300 nm, is more preferably between 90 and 200 nm, is further more preferably between 90 and 175 nm, and is still further more preferably between 100 and 175 mm. In addition, the Rt value of the present invention can be obtained by determining refractive indices nx, ny, and nz in such a manner that measurement of three-dimensional refractive index is carried out at a wavelength of 590 nm at 23° C. and 50 percent relative humidity, employing an automatic double refractometer (for instance, a KOBRA-21ADH manufactured by Oji Keisokukiki Co., Ltd.).

Further, the film for a liquid crystal display of the present invention is.comprised of a fatty acid cellulose ester film having a retardation value (Ro), in the plane direction defined by formula 2, of 30 nm or less:

$$Ro=(nx-ny)\times D \quad \text{(Formula 2)}$$

Ro is more preferably 20 nm or less, and is further more preferably 10 nm or less.

Further, a formula of (nx+ny)/2−nz>0 is preferably held.

Still further, the thickness of the fatty acid cellulose ester film is preferably between 40 and 190 $\mu$m, is more preferably between 60 and 190 $\mu$m, is further more preferably between 75 and 190 nm, and sill further more preferably between 75 and 150 $\mu$m.

Tearing strength of the cellulose ester film is preferably over 10 g, more preferably 15 g or more and most preferably 20 g or more. The measurement is preferably based on ASTMD-1992.

Further, the number average molecular weight of fatty acid cellulose ester is preferably between 70,000 and 300,000, and is preferably between 90,000 and 200,000.

Said fatty acid cellulose ester can be synthesized employing acid anhydrides and acid chlorides as the acylation agents. When said acylation agents are acid anhydrides, organic acids (for instance, acetic acid) as well as methylene chloride are employed as the reaction solvents, and acid catalysts such as sulfuric acid are employed as the catalysts. When the acylation agents are acid chlorides, basic compounds are employed as catalysts. In the most common synthesis method, cellulose is subjected to esterification employing organic acid components comprising organic acids (acetic acid and propionic acid) corresponding to an acetyl group and a propionyl group, or those acid anhydrides (acetic anhydride and propionic anhydride), and thus cellulose esters are synthesized. The employed amount of acetylation agents and propionylation agents is regulated so that synthesized esters are in the aforementioned range. The employed amount of reaction solvents is preferably between 100 and 1,000 weight parts with respect to 100 weight parts of cellulose. The employed amount of acid catalysts is preferably between 0.1 and 20 weight parts with respect to 100 weight parts of cellulose. Reaction temperature is preferably between 10 and 120° C. Further, after completion of the acylation reaction, if desired, the substitution degree may be adjusted employing hydrolysis (saponification). After completion of the reaction, the resulting reaction mixture is separated employing common means such as precipitation, washed, and is subsequently dried. Thus fatty acid ester (cellulose acetate propionate) is obtained.

For example, synthesis can be carried out employing the method described below. First, added to 299 g of cellulose are 907 g of acetic acid and 223 g of propionic acid, and the resulting mixture is mixed at 54° C. for 30 minutes. After cooling the mixture, esterification is carried our by adding 318 g of acetic anhydride cooled to about 20° C., 813 g of propionic anhydride, 10.6 g of sulfuric acid, and 6.3 g of propionic acid. During esterification, the maximum temperature is maintained at 40° C. After conducting the esterification for 150 minutes, a mixed solution consisting of 295 g of acetic acid and 98.5 g of water as the reaction termination agent is added over 20 minutes, and excessive anhydrides are subjected to hydrolysis. The reaction composition is maintained at 60° C., and 886 g of acetic acid and 295 g of water are added. After one hour, an aqueous solution containing 18.0 g of magnesium acetate is added, and then sulfuric acid in the reaction system is neutralized. The degree of acetyl substitution and propionyl substitution of the obtained cellulose acetate propionate are 2.1 and 0.8, respectively, and the number average molecular weight is about 120,000.

Employed individually or in combination as the fatty acid cellulose ester of the present invention are fatty acid ester synthesized employing cotton linters and fatty acid ester synthesized from wood pulp. Cellulose ester synthesized employing cotton linters is preferably employed at a larger ratio, because it is more readily peeled from a belt or drum, and thus enhances productivity. When the content of cellulose ester synthesized employing cotton linters is at least 60 percent, the peeling properties are markedly improved. Therefore, the content is preferably at least 60 percent, is more preferably at least 85 percent, and is most preferably 100 percent.

Listed as solvents which dissolve the fatty acid cellulose ester of the present invention and form a dope may be methylene chloride, methyl acetate, ethyl acetate, amyl acetate, acetone, tetrahydrofuran, 1,3-dioxolan, 1,4-dioxolan, cyclohexanone, 2,2,2-trifluoroethanol, 2,2,3,3-tetrafluoro-1-propanol, 1,3-difluoro-2-propanol, and the like. Incidentally, chlorine based solvents such as methylene chloride may be employed without causing any problem from the technical aspect. It is preferred that amount of the chlorine based solvent is not more than 50% in the solvent. Methyl acetate, ethyl acetate, acetone, and the like, cause the least environmental problem. Specifically, the content of methyl acetate is preferably at least 50 percent by weight with respect to the total organic solvents. Acetone is preferably employed in an amount of 5 to 30 percent by weight with respect to the total organic solvents, together with methyl acetate, because it makes it possible to decrease the dope viscosity. In the present invention, containing of as little as possible chlorine based solvents means that the content of the chlorine based solvents is no more than 10 percent with respect to the total organic solvents, is more preferably no more then 5 percent, and is most preferably 0 percent.

In addition to the organic solvents described above, alcohols having from 1 to 30 carbon atoms are preferably incorporated into the fatty acid cellulose ester dope of the present invention in an amount of 1 to 30 percent. When alcohols are incorporated, after casting the dope onto a support, solvents start to evaporate and the web (a dope layer formed by casting a dope on a casting support is designated as the web) is gelled and the web is strengthened. Thus it is possible to more readily peel the web from the support. Further, it is possible to obtain effects which accelerate the dissolution of fatty acid cellulose ester. Listed as alcohols having from 1 to 4 carbon atoms are methanol, ethanol, n-propanol, iso-propanol, n-butanol, sec-butanol, and tert-butanol. Of these, ethanol is preferred, based on the stability of the resulting dope, its boiling point, drying properties, non-toxicity, and the like.

The solid portion concentration in a dope is commonly, and preferably, between 10 and 40 percent. From the viewpoint of obtaining excellent flatness of a film, the viscosity of a dope is preferably controlled to be in the range of 100 to 500 poise. The dope, which has been prepared as described above, is filtered employing a filter media, defoamed, and subsequently conveyed to the next process, employing a pump.

Plasticizers, matting agents, UV absorbers, antioxidants, dyes, and the like may also be incorporated into said dope.

Fatty acid ester cellulose, having an acetyl group as well as a propionyl group employed in the present invention, exhibits effects of a plasticizer. As a result, sufficient film properties are obtained without the addition of plasticizer, or at most addition in small amounts. However, plasticizers may be added for other purposes. For example, for the purpose to enhance the moisture resistance of film, added may be alkyl phthalyl alkyl glycolates, phosphoric acid esters, carboxylic acid esters, phthalic acid ester, fatty acid ester, citric acid ester and the like.

Listed as alkyl phthalyl alkyl glycolates are, for example, methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, methyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate, octyl phthalyl ethyl glycolate, and the like.

Listed as phosphoric acid esters may be, for example, triphenyl phosphate, tricresyl phosphate, cresyl diphenyl phosphate, phenyl diphenyl phosphate, octyl diphenyl phosphate, trioctyl phosphate, tributyl phosphate, and the like.

Carboxylic acid esters include, for example, phthalic acid esters and citric acid esters. Listed as said phthalic acid esters may be dimethyl phthalate, diethyl phthalate, dimethoxyethyl phthalate, dimethyl phthalate, dioctyl phthalate, dibutyl phthalate, di-2-ethyl hexyl phthalate, and the like, while listed as said citric acid esters may be, for example, acetyl trimethyl citrate, acetyl triethyl citrate, and acetyl tributyl acetate.

In addition, butyl oleate, methyl acetyl recinoleate, dibutyl sebacate, triacetin, and the like are preferably employed individually or in combination.

If desired, two or more types of plasticizers may be employed in combination. Phosphoric acid ester based plasticizers are preferred because when employed at a ratio of no more than 50 percent, the cellulose ester film is barely subjected to hydrolysis and exhibits excellent durability. Further, a low content of phosphoric acid based plasticizers is preferred. Particularly preferred is the sole use of phthalic acid ester based or glycolic acid ester based plasticizers. Of these, methyl phthalyl methyl glycolate, ethyl phthalyl ethyl glycolate, propyl phthalyl propyl glycolate, butyl phthalyl butyl glycolate, and octyl phthalyl octyl glycolate are preferred, and particularly employed is ethyl phthalyl ethyl glycolate. Alternatively, two or more types of these alkyl phthalyl alkyl glycolates are employed in combination. The amount of plasticizers employed for said purpose is preferably between 1 and 30 percent with respect to the cellulose ester, and is most preferably between 4 and 13 percent. These compounds may be added along with cellulose ester and solvents during preparation of a cellulose ester solution or may be added during the preparation of the solution or after said preparation.

With the purpose to improve yellow hue of film, dyes are incorporated. Since cellulose ester film is tinted slightly yellow, dyes are preferred which are capable of tinting to gray as seen in common photographic supports. Thus blue and violet dyes are preferably employed. However, being different from the photographic supports, since it is unnecessary to minimize light piping, only a small amount of dye addition may be sufficient. Specifically the content of dyes is preferably between 1 and 100 ppm with respect to the cellulose ester, and is more preferably between 2 and 50 ppm. Gray may be obtained by appropriately combining a plurality of dyes.

When films are not sufficiently slippery, they are subjected to blocking with each other, and occasionally, ease of handling is degraded. Matting agents such as fine inorganic particles including silicon dioxide, titanium dioxide, sintered calcium silicate, hydrated calcium silicate, aluminum silicate, magnesium silicate, crosslinked polymers, and the like are preferably incorporated into the film, based on the present invention.

Further, in order to decrease the haze of a film, fine particles such as silicon dioxide are preferably subjected to surface treatment employing organic substances. Cited as preferred organic substances for said surface treatment are halosilanes, alkoxysilanes, silazanes, siloxanes, and the like. The matting effect increases as the average particle diameter of fine particles increases, while transparency increases as said diameter decreases. Accordingly, the average primary particles diameter of fine particles is no more than 0.1 $\mu$m, preferably between 5 and 50 nm, and more preferably between 7 and 14 nm. Listed as fine particles of silicon dioxide are Aerosil 200, 200V, 300, R972, R972V, R974, R202, R812, OX50, TT600 and the like, all of which are manufactured by Nihon Aerosil Co., ltd. Of these, preferably listed are Aerosil R972, R972V, R974, R202, R812, and the like. Said matting agents are preferably blended to obtain a film haze of no more than 0.6 percent, and a friction coefficient of no more than 0.5. The amount of matting agents, which are employed for said purpose, is preferably between 0.005 and 0.3 percent with respect to fatty acid cellulose ester. These fine particles usually exist in an aggregated form in the film and it is preferable to make the surface of the film roughness of 0.01 to 1.0 $\mu$m.

Liquid crystal displays are increasingly employed in the open atmosphere. Thus it is important to provide a protective film for a polarizing plate with the function to absorb ultraviolet rays. UV absorbers are preferably incorporated into the film of the present invention. Preferred as UV absorbers are those which efficiently absorb ultraviolet rays having a wavelength of no longer than 370 nm from the viewpoint of minimizing the degradation of liquid crystals and which minimally absorb visible light having a wavelength of at least 400 nm from the viewpoint of producing an excellent liquid crystal display. Specifically, the transmittance at a wavelength of 370 nm is required to be no more than 10 percent. The added amount of UV absorbers is preferably in the range of 0.5 to 5 percent with respect to the fatty acid cellulose ester, and is more preferably in the range of 0.6 to 2.0 percent. The amount is particularly preferably 0.8 to 2.0 wt %.

UV absorbers, which are employed to achieve said purposes, preferably have no absorption in the visible light range. Listed as such UV absorbers are benzotriazole based compounds, benzophenone based compounds, salicylic acid based compounds and the like. Examples of such UV absorbers include 2-(2'-hydroxy-5-methylphenyl) benzotriazole, 2-(2'-hydroxy-3',5'-di-t-butylphenyl) benzotriazole, 2-(2'-hydroxy-3'-di-t-butyl-methylphenyl) benzotriazole, 2,4-dihydroxybenzophenone, 2-hydroxy-4-methoxybenzophenone, 2-hydroxy-4-n-octocybenzophenone, 4-dodecyloxy-2-hydrooxybenzophenone, 2,2',4,4'-tetrahydroxybenzophenone, 2,2'-dihydroxoy-4,4'-dimethoxybenzophenone, phenyl salicylate, methyl salicylate, and the like.

In the present invention, at least one of these UV absorbers is preferably employed, and at least two of different UV absorbers may be incorporated.

The addition methods of said UV absorbers are as follows. They may be dissolved in organic solvents such as alcohol, methylene chloride, dioxolan, and the like and the resulting solution is added to a dope. Alternatively, they may be added directly to a dope. UV absorbers such as inorganic powders, which are not soluble in organic solvents, may be dispersed into a mixture of organic solvents and cellulose ester, employing a dissolver or a sand mill, and added to a dope.

In the present invention, the employed amount of UV absorbers is commonly between 0.1 and 2.5 percent with respect to the cellulose ester, is preferably between 0.5 and 2.0 percent, and is more preferably between 0.8 and 2.0 percent. However, it is not preferred that the employed amount of UV absorbers exceeds 2.5 percent, because transparency tends to be degraded.

In order to enhance the heat resistance of a film, hindered phenol based compounds are preferably employed. The added amount of these compounds is preferably between 1 ppm and 1.0 percent by weight with respect to the cellulose ester, and is more preferably between 10 and 1,000 ppm.

Further, in addition to these compounds, heat stabilizers such as alkali earth metal salts comprised of calcium, magnesium, and the like, may also be added.

In addition to the aforementioned compounds, further, added may be antistatic agents, flame retarders, lubricants, oils, and the like.

When a film is prepared employing cellulose ester which comprises insoluble foreign matter particles, they cause diffused reflection. Thus when such film is employed in a liquid crystal display, light from the crystal cell is scattered to cause degraded visibility of the display. It is difficult to detect insoluble foreign matter particles under ordinary light. However, when observation is made in such a manner that two polarizing plates are arranged in the right angle (cross Nicole) state and a cellulose ester film is placed between them then it is illuminated from one side, it is possible to detect gleaming foreign matter particles in a dark visual field. Thus it is possible to readily determine the sizes as well as the numbers of foreign matter particles. The number of foreign matter particles having a size of 5 to 50 $\mu$m is preferably no more than 200 per 250 mm$^2$ and the number of foreign matter particles having a size of at least 50 nm is preferably substantially 0. More preferably, the number of foreign matter particles having a size of 5 to 50 $\mu$m is no more than 100 per 250 mm$^2$. Foreign matter particles having a size of less than 5 $\mu$m are visually not problematic, however number of the foreign matter particles is preferable as less as possible if the size is less than 5 $\mu$m. On the other hand, foreign matter particles having a size of at least 50 $\mu$m are barely formed during the production of cellulose ester employing common methods. Foreign matter particles such as metal, sealing materials, and the like having a size of at least 50 $\mu$m, are removed during production process of cellulose ester. Due to that, foreign matter particles in a dope, prepared by dissolving cellulose ester, are filtered to remove foreign matter particles. Usable filters are those which exhibit resistance to organic solvents. Employed as such filters may be, for example, sintered metal filters, metallic fiber filters, resinous filters (woven fabric and nonwoven fabric), ceramic filters, glass filters, and paper filters. Further, it is possible to suitably choose the sieve opening of filters depending upon the size of foreign substance to be removed, and selection is generally made from the range of 0.1 to 100 $\mu$m. Filters may be employed individually or may be employed in a plurality of them in series. Specifically, filtration is preferably carried out employing a paper filter having a water filtration time of at least 20 seconds and a filtration pressure of no more than 1.6 Mpa, is more preferably carried out employing a paper filter having a water filtration time of at least 30 second and a filtration pressure of no more than 1.0 Mpa, and is further more preferably carried out employing a paper filter having a water filtration in time of at least 40 seconds and a filtration pressure of no more than 1.0 Mpa. It is preferable to use paper filters at least two of them overlapping. It is possible to control the filtration pressure by suitably controlling the filtration flow rate and the filtration area.

The dissolution Process is one in which cellulose ester flakes are dissolved, while stirring, in organic solvents mainly comprised of good solvents for said flakes, employing a dissolution vessel, and thereby a cellulose ester solution (hereinafter referred to as a dope) is prepared. In order to carry out said dissolution, there are various methods such as a method in which dissolution is carried out at a normal atmospheric pressure, a method in which dissolution is carried out at a temperature lower than the boiling point of the primary solvent, a method in which dissolution is carried out at a temperature higher than the boiling point of the main solvent under an increase of pressure, a cooling dissolution method in which dissolution is carried out at a lowering temperature, as described in J. M. G. Cowie et al., Makromol hem., volume 143, page 105 (1971), and Japanese Patent Publication Open to Public Inspection Nos. 9-95544 and 9-95557, and others, a method in which dissolution is carried out at a high pressure, and the like. The resultant dope is filtered employing filter materials, is then defoamed, and is subsequently pumped to the next process.

An obtained dope is cast onto a support. Employed as casting methods may be a band method or a drum method. Subsequently, a film, which is prepared as described above, is peeled from the support. Thereafter, tension is applied to the resulting film which is dried while being conveyed through a drying zone.

Casting process: a process in which a dope is conveyed to a pressure die through a pressure type metering gear pump, and at the casting site, said dope is cast from said pressure die onto a support for casting (hereinafter occasionally referred to as a support) which is an infinitely moving endless metal belt or a rotating metal drum. The surface of the support for casting is specular. Listed as other casting methods are a doctor blade method in which the thickness of the dope layer is regulated employing a blade, and also a reverse roll coater method in which regulation is carried out employing a roll which rotates in the reverse direction. However, said pressure die is preferred in which the slit shape at the mouth piece portion can be regulated and the film thickness is readily regulated to be uniform. The pressure die includes a coat hanger die, a "T" die, and the like, and any of these may preferably be employed. In order to increase the casting speed, at least two pressure dies may be provided and at least two layers may be simultaneously cast while dividing the dope.

Solvent evaporation process: a process in which a web is heated on the support for casting and solvents are thereby evaporated. In order to evaporate solvents, methods include one in which air is blown from the web side, and/or a method in which heating is carried out from the reverse surface of the support employing liquid, and another in which heating is carried out from the surface as well as the revere surface employing heat radiation. Of these, the reverse surface liquid heating method is preferred due to high drying efficiency. Further, these methods are preferably combined.

Peeling process: a process in which a web, which has been subjected to evaporation of solvents on the support, is peeled at the peeling site. The peeled web is conveyed to the subsequent process. When the residual solvent amount (refer to the formula described below) is too excessive, it may be difficult to peel the web. On the contrary, when peeling is carried out after fully drying the web on the support, a part of the web may peel prior to the peeling site. Listed as a method to increase the casting speed is a gel casting method (in which peeling can be carried out even though the amount of residual solvents is relatively great). Said gel casting methods include a method in which poor solvents with respect to the cellulose ester are added to a dope and gelling is carried out after casting said dope, and also a method in which gelling is carried out by decreasing the temperature of the support, and the like. Further, also included is a method in which metal salts are added to the dope. By strengthening the web through gelling the dope on the support, it is possible to carry out earlier peeling and to increase the casting speed. When peeling is carried out at the time when the residual solvent amount is still relatively great, the web may be too soft. Thus during peeling, the flatness of the web tends to be degraded, and wrinkles and longitudinal streaks tend to be formed. Accordingly, the residual solvent amount is determined so that productivity and quality are balanced.

Drying process: a process which dries a web employing a drying apparatus in which said web is alternatively passed through staggered rolls and/or a tenter apparatus in which said web is conveyed while the web width is maintained by holding both web edges employing pins or clips. A common drying method is one in which both surfaces of the web are subjected to hot air flow. Instead of air, employed is a method in which heating is carried out employing microwaves. Too rapid drying tends to degrade the flatness of the finished film. High temperature drying is preferably carried out when the residual solvent amount is no more than 8 percent. During the entire drying process, drying temperatures are commonly between 40 and 250° C., and are preferably between 70 and 180° C. Drying temperature, drying air volume, and drying time vary depending on employed solvents. Thus drying conditions may be suitably selected depending on types of employed solvents and their combination.

In the drying process, the web tends to shrink in the width direction due to the evaporation of solvents. When rapid drying is carried out at a relatively high temperature, shrinkage increases further. Drying is preferably carried out while minimizing the resulting shrinkage so that the finished film exhibits excellent flatness. From this viewpoint, a drying method (a tenter method), as shown, for example, in Japanese Patent Publication Open to Public Inspection No. 62-45525, is preferred in which the entire or a part of the drying process is carried out while holding both edges of the web in the width direction employing clips.

Winding process: a process in which after decreasing the residual solvent amount to no more than 2 percent, the resulting web is wound. By decreasing the residual solvent amount to no more than 0.4 percent, it is possible to obtain a film having excellent dimensional stability. Employed as winding methods may be those which are commonly employed. Said methods include a constant torque method, a constant tension method, a taper tension method, an inner stress constant program tension control method, and the like. Any of these may be selected and employed.

The residual solvent amount is expressed employing the formula described below:

Residual solvent amount (in percent)=(M−N)/N×100; wherein M represents the weight of a web at an optional time, and N represents the weight when M is dried at 110° C. for 3 hours.

The thickness of a fatty acid cellulose ester film is preferably regulated while controlling the dope concentration, the pumping volume, the slit distance of the mouth piece of the die, the excluding pressure at the die, and the speed of the support for casting. Further, a method which makes the film thickness uniform is preferred in which said film thickness is controlled using feedback information from a film thickness detecting means.

In the process from casting to drying, air may be employed as an ambient gas in the drying apparatus. On the other hand, drying may also be carried out in an ambience comprised of inert gases such as nitrogen gas, carbon dioxide gas, and the like. However, it must be noted that the concentration of evaporated solvents in the drying environment does not approach their explosion limits.

In order to obtain a film having a retardation value in the thickness direction (Rt value) of the present invention, listed are the methods described below. However, the present invention is not limited to these methods.

(1) In the process until a film is peeled from a belt or drum, as the residual solvent amount during peeling decreases, the Rt value increases, while as said residual solvent amount increases, the Rt value decreases. In this case, the residual solvent amount during peeling is preferably between 5 and 100 percent, is more preferably between 5 and 80 percent, and further more preferably between 10 and 45 percent.

(2) As peeling tension as well as conveyance tension in a drying zone increases, the Rt value decreases, while when they decrease, the Rt value increases: Peeling tension is preferably between 50 and 400 N/m, is more preferably between 100 and 300 N/m, and is further more preferably between 100 and 250 N/m. Further, conveyance tension in the drying zone is preferably between 50 and 200 N/m, is more preferably between 80 and 150 N/m, and is further more preferably between 80 and 120 N/m.

(3) There is a pin tenter method in which a film is dried while being stretched or a drying method employing a clip tenter method. In this case, as the stretching factor increases, the Rt value increases, while as said factor decreases, the Rt value decreases. The stretching factor is preferably between 2 and 50 percent, is more preferably between 5 and 40 percent, and is further more preferably between 10 and 30 percent.

Further, the thickness of the protective film for a polarizing plate of the present invention is preferably between 75 and 190 µm, is more preferably between 100 and 175 µm, and is further more preferably between 120 and 160 µm.

In the present invention, in order to minimize the variation of the retardation value (Rt) due to humidity, as well as to obtain excellent viewing angle characteristics, the equilibrium moisture content ratio of the optical film of the present invention as well as the protective film for a polarizing plate (said optical film which is-prepared by adhering a polarizing plate) of the present invention, is preferably no more than 6 percent. Said moisture content ratio is more preferred as the percentage decreases to no more than 5 percent, to no more than 4 percent, to no more than 3 percent, to no more than 2 percent, and finally to no more than 1 percent. The particularly preferred moisture content is substantially zero. "Substantially zero", as described in the present invention, means no more than 0.5 percent.

Incidentally, said equilibrium moisture content ratio is obtained as follows. Karl Fischer's moisture meter, specifically a micro-volume moisture meter CA-06 and a moisture evaporation device VA-06 (manufactured by Mitsubishi Kasei Co., Ltd.) are employed. After heating at 120° C. for 45 minutes, it is possible to calculate the moisture content ratio employing the formula described below:

Moisture content ratio (in percent)=remaining moisture weight/film weight after heating treatment×100.

Employed as the polarizing layer provided on the surface of said protective film for a polarizing plate may be those which are conventionally known in the art. For example, employed are those which are obtained by treating a film comprised of hydrophilic polymer such as polyvinyl alcohol with dichroic dyes such as iodine and then stretched, or which are prepared by treating a plastic film such as polyvinyl chloride to result in polyene orientation. The polarizing plate is then structured in such a manner that said protective film for a polarizing plate is laminated onto at least one surface of said polarizing layer. The polarizing plate is prepared by applying composition described in U.S. Pat. No. 6,049,428 on the polarizing plate protective film.

The polarizing plate prepared as described above is provided on one surface or both surfaces of a VA type liquid crystal cell. By employing the resulting polarizing plate, the liquid crystal display of the present invention is obtained.

When optical anisotropy is achieved by applying a liquid crystalline compound onto a transparent support, it is possible to carry out desired orientation by applying said liquid crystalline compound onto the alignment layer which has been prepared on said transparent support.

Listed as methods to orient a liquid crystalline compound, without using the alignment layer, may be a method in which a liquid crystalline compound is heated to a temperature at which liquid crystal properties are exhibited, and is then subjected to application of an electric field or a magnetic field. It is possible to obtain an orientation state employing a method in which heated air is blown or a liquid crystalline compound flows in the range of liquid crystal temperature by declining the base board. Of these, from the viewpoint of ease of its production, it is preferable that after providing an alignment layer, a rubbing treatment is carried out and applying a liquid crystalline compound onto the resultant alignment layer then carries out orientation.

Now, said alignment layer will be described. Specifically listed are the following resins as well as base boards, though the present invention is not limited to these. For example, listed are polyimides, polyamidoimides, polyamides, polyether imides, polyether ether ketones, polyether ketones, polyketone sulfides, polyether sulfones, polysulfones, polyphenylene sulfides, polyphenylene oxides, polyethylene terephthalate, polybutylene terephthalate, polyethylene naphthalate, polyacetals, polycarbonates, polyallylates, acrylic resins, polyvinyl alcohols, polypropylene, cellulose based plastics, epoxy resins, phenol resins, and the like.

The alignment layer can be obtained in such a manner that after applying any of the aforementioned orientation materials onto a transparent support, and subsequently drying the resultant coating, a rubbing treatment is carried out.

A polyimide layer (preferably polyimide having fluorine atoms), which is widely employed as an LCD alignment layer, is preferred as the alignment layer. It is possible to obtain said layer by applying, onto a transparent support, polyamic acid (for example, LQ/LX Series manufactured by Hitachi Kasei Co., Ltd., and SE Series manufactured by Nissan Kagaku Co., Ltd) and applying thermal treatment to the resultant coating and then rubbing the resultant coated layer.

The aforementioned rubbing treatment may be carried out utilizing a treatment method which is widely employed as an LCD liquid crystal orientation process. Namely, it is possible to employ a method in which orientation is obtained by rubbing the surface of the alignment layer in the definite direction employing paper, gauze, felt, rubber, nylon, polyester fiber, and the like. Commonly, the surface of the alignment layer is rubbed several times employing a cloth prepared by uniformly planted fiber having a uniform length and diameter.

When liquid crystalline compounds employed in the present invention are liquid crystallizing polymers, listed as chemical structure are main chain type liquid crystalline polymers such as, for example, polyesters, polyimides, polyamides, polyesters, polycarbonates, polyester imides, and the like. Further, listed as side chain type liquid crystalline polymers are, for example, polyacrylates, polymethacrylates, polysiloxanes, polymalonates, and the like.

As methods for coating liquid crystalline compounds, a solution prepared by dissolving said liquid crystalline compounds in bulk, or an organic solvent can be coated employing methods such as curtain coating, extrusion coating, roll coating, dip coating, spin coating, print coating, spray coating, and slide coating, and the like.

When a solution is coated, after said coating, the solvent is removed, and it is possible to obtain a liquid crystal layer having a uniform thickness.

It is possible to fix the orientation of the liquid crystal in the liquid crystal layer through chemical reaction utilizing the action of heat and/or light energy. Specifically, monomeric liquid crystalline compounds generally exhibit low viscosity and the orientation of the resultant liquid crystal tends to vary due to thermal causes. Accordingly, it is possible that the liquid crystalline compounds having an ethylenic unsaturated linkage group are subjected to fixation through hardening reaction such as light radical reaction and the like, employing a photopolymerization initiator.

In the present invention, when the photopolymerization initiator is employed during fixing the orientation, in order to generate radicals, it is possible to employ light sources described below. For example, are preferred light sources such as a high pressure mercury lamp, a metal halide lamp, and the like, which can effectively emits near ultraviolet rays. Those having a maximum molar absorption coefficient of at least 100 are preferred, and those having the same of at least 500 are more preferred. If desired, employed as radiations for photopolymerization may be electron beam, ultraviolet rays, visible light, and infrared rays (heat rays). Generally, however, preferred are ultraviolet rays. Listed as ultraviolet ray emitting sources may be low pressure mercury lamps (such as a bactericidal lamp, a fluorescent light chemical lamp, and a black light), high pressure discharge lamps (such as a high pressure mercury lamp, and a metal halide lamp), and short arc discharge lamps (such as an ultra-high pressure mercury lamp, a xenon lamp, and a mercury xenon lamp).

On the other hand, when polymerization initiators are employed, the following compounds may be listed: for example, azobis compounds, peroxides, hydroperoxides, redox catalysts, and the like, such as potassium persulfate, ammonium persulfate, tert-butyl peroctoate, benzoylperoxide, isopropyl percarbonate, 2,4-dichlorobenzoyl peroxide, methyl ethyl ketone peroxide, cumene hydroperoxide, dicumyl peroxide, azobisisobutyronitrile, 2,2'-azobis(2-aminodipropane)hydrochloride, or benzophenones, acetophenones, benzoins, thioxanthones, and the like. These are detailed in "Shigaisen Koka System (Ultraviolet Ray Hardening system)", Sogo Gijutsu Center, pages 63 to 146, 1989.

Further, for the polymerization of compounds having a epoxy group, generally employed as ultraviolet ray activating cationic catalysts are allyldiazonium salts (such as hexafluorophosphate, and tetrafluoroborate), dialllyliodonium salts, VIa Group allylonium salts (such as allylsulfonium salts having an anion such as PFe, AsFe, and SbFe).

When liquid crystalline monomers are selected, an important factor is the availability of liquid crystalline compounds substituted with a functional group which is capable of subjecting said liquid crystalline compounds to result in hardening reaction. By selecting such compounds, one of useful methods is available in which after orienting liquid crystalline compounds, the resultant orientation is fixed employing the aforementioned hardening reaction due to light or heat.

On the other hand, when liquid crystalline compounds are liquid crystalline polymers, it is unnecessary to fix the orientation of liquid crystals employing hardening reaction, that is the aforementioned chemical reaction. In the temperature range in which an optically anisotropic film is employed without causing problems, for example, when a liquid crystalline polymer has a liquid crystal transition temperature of 90° C. or higher, after applying said liquid crystalline polymer onto an alignment layer, the resultant coating is heated at a temperature within the range of the liquid crystal transition temperature to results in orientation and then cooled to room temperature. By so doing, the orientation of the liquid crystal is maintained.

Further, it is possible to assume such a case that a support is subjected to deformation at a temperature at which the orientation of the liquid crystalline polymer is carried out. In such a case, after subjecting a heat resistant film to the aforementioned orientation treatment, a liquid crystal layer may be transferred to the transparent support of the present invention via an adhesive layer.

In order to minimize optical deformation such as abrasion and the like which are formed during maintaining the orientation and preparing a polarizing plate, a protective layer may be provided. Listed as materials for said protective layer may be polymers such as polymethyl methacrylate, acrylic acid/methacrylic acid copolymers, styrene/anhydrous maleiimide copolymers, polyvinyl alcohol, poly(N-methylolacrylamide), styrene/vinyl toluene copolymers, nitrocellulose, polyvinyl chloride, chlorinated polyolefin, polyester, polyimide, vinyl acetate/vinyl chloride copolymers, ethylene/vinyl acetate copolymers, polyethylene, polypropylene, polycarbonate, and the like, and derivatives thereof. It is possible to provide said protective layer in such a manner that a solution comprised of any of these. polymers is prepared, is applied to a support while employing the aforementioned coating method, and is subsequently dried.

When liquid crystalline compounds of the present invention are those having discotic structure units, compounds may be employed which are described in, for example, Japanese Registered Patent Nos. 2587398, 2640083, 2641086, 2692033, 2692035, 2767382, 2747789, 2866372, and others.

When liquid crystalline compounds of the present invention are those of polymers, employed may be compounds having structures which are described in, for example, Japanese Registered Patent Nos. 2592694, 2687035, 2711585, 2660601, and others, and Japanese Patent Publication Open to Public Inspection Nos. 10-186356, 10-206637, 10-333134, and others.

Commonly listed as liquid crystalline compounds except for discotic liquid crystals as well as liquid crystalline polymers are rod-shaped monomeric liquid crystals. From the viewpoint of the fixation of orientation, preferred are liquid crystalline compounds having an unsaturated ethylenic group. For example, employed may be compounds having structures described in, for instance, Japanese Patent Publication Open to Public Inspection Nos. 9-281480, and 9-281481.

Regarding a compensation film to control optical characteristics, the greater retardation value of said film in the thickness direction is not always preferred, and there is the preferable range. In order to obtain a preferable retardation value as a whole, when the ratio of the aforementioned retardation value (Rt' value) of a liquid crystal layer to the retardation value (Rt value) of a transparent support satisfies the following relationship, the transparent support having the liquid crystal layer exhibits suitable characteristics as the compensation film to control optical characteristics in liquid crystal displays:

Formula 3

$$Rt\ \text{ratio}=(Rt'/Rt)\leq 1.2$$

wherein Rt' is the retardation value in the thickness direction of the liquid crystal layer, and Rt is the retardation value in the thickness direction of the transparent support.

Herein, Rt' has the following relationship.

$$Rt'=[(nx'+ny')/2-nz']\times d'$$

wherein nx' and ny' each represent main refractive indices in the x' direction and the y' direction in the plane of the liquid crystal layer, and nx' and ny' may be the same or different; while nz' represents the refractive index in the thickness direction of the liquid crystal layer; and d (in nm) represents the thickness of the liquid crystal layer.

Further, Rt is expressed by the following formula.

$$Rt=[(nx+ny)/2-nz]\times d$$

wherein nx and ny each represent main refractive indices in the x direction and the y direction in the plane.of the transparent support; while nz represents the refractive index in the thickness direction of said film; and d (in nm) represents the thickness of said film. in the above formulas, the x and x' directions in the plane as described wherein mean the directions parallel to the film casting direction, while the y and y' directions mean the directions vertical to the casting direction.

In a more preferred embodiment, Rt ratio=(Rt'/Rt)≦0.8 is satisfied.

The retardation value of a liquid crystal layer is obtained as follows. Specifically, the retardation value of an optical film, prepared by applying a liquid crystal layer to a transparent support, is determined, and the retardation value of the liquid crystal layer is obtained based on the difference from the retardation value of the support film.

When liquid crystalline compounds constituting a liquid crystal layer are monomers having a chemically reactive group, after being oriented on an alignment layer, the resultant orientation is preferably fixed while being hardened employing light or heat.

Further, the polarizing plate of the present invention is one which is sandwiched between a first film and a second film. Incidentally, another film as well as a layer may be positioned between said first film and said polarizer, and between said second film and said polarizer. At least one of said first film and said second film is the film for a liquid crystal display of the present invention. Further, the film for a liquid display of the present invention may be directly adhered onto said polarizer. Alternatively, one surface or both surfaces of said polarizer may be adhered to the polarizing plate protective film comprised of TAC and the like, and onto said polarizing plate protective film, the film for liquid crystal display of the present invention may be adhered.

Further, the liquid crystal display of the present invention comprises a first polarizing plate, a liquid crystal cell, and a second polarizing plate which is provided on the inner side of the first polarizing plate as well as the liquid crystal cell. The inner side is the opposite side against outer side such as fresh air side or observer side. Still further, the first polarizing plate comprises a first polarizer, a first protective film for the polarizing plate provided on the surface of the first polarizer on the side which does not face the liquid crystal cell, and a second protective film for the polarizing plate provided on the surface of the first polarizer on the side which faces the liquid crystal cell. The second polarizing plate comprises a second polarizer, a third protective film for the polarizing plate provided on the surface of the second polarizer on the side which faces the liquid crystal cell, and a fourth protective film for the polarizing plate provided on the surface of the second polarizer on the side which does not face the liquid crystal cell.

At least one of the first film, the second film, the third film, and the fourth film is the film for a liquid crystal display of the present invention. Further, another film as well as another layer may be provided between any one of the first to the fourth films and the polarizer. Further, the film for a liquid crystal display of the present invention may be directly adhered onto the polarizer so as to enhance the function as a protective film for a polarizing plate. The protective film for a polarizing plate, which is prepared employing TAC, may be adhered onto one surface or both surfaces of the polarizer, and the film for a liquid crystal display of the present invention may be adhered onto said protective film for a polarizing plate.

Further, in this liquid crystal display, at least one of the second film and the third film is preferably the film for a liquid crystal display of the present invention. Both the second film and the third film are more preferably the film for a liquid crystal display of the present invention.

Listed as liquid crystal displays can be vertical alignment (VA) type liquid crystal displays and twist nematic type (TN) type liquid crystal displays such as STN, TN, and the like. Of course, TFT type liquid crystal displays may also be used.

FIG. 1 is a schematic view of one example of a liquid crystal display. Numeral 5 is a light source and numeral 4 is a liquid crystal cell. Numeral 31 is a first polarizing plate and numeral 32 is a second polarizing plate. First polarizing plate 31 comprises first film 21, second film 22, and first polarizer 110. Second polarizing plate 32 comprises third film 23, fourth film 24, and second polarizer 120. In this example, second film 22 as well as third film 23 is the film for a liquid crystal display of the present invention, and first film 21 as well as fourth film 24 is a protective film for a polarizing plate, which is prepared employing triacetyl cellulose (TAC). Needless to say, the liquid crystal display of the present invention is not limited to said embodiments.

EXAMPLES

In the following, the present invention will be specifically described with reference to examples. However, the present invention is not limited to these examples.

Example 1
(Preparation and Evaluation of Fatty Acid Cellulose Ester Film)

The compositions described below were placed in a tightly sealed pressure vessel, heated to 80° C., and completely dissolved while stirring under a pressure of 500 kPa, while maintaining said temperature.

| | |
|---|---|
| Cellulose acetate propionate (CAP) (substitution degree is described in Table 1) | 120 weight parts |
| 2-(2'-hydroxy-3',5'-di-t-butylphenyl) (UV absorber) | 1 weight part |
| Ethyl phthalyl ethyl glycolate (plasticizer) | 4 weight parts |
| Fine silica particles (AEROSIL 200 manufactured by Nihon Aerosil Co., Ltd.) (0.016 μm) | 0.1 weight part |
| Methyl acetate | 300 weight parts |
| Ethanol | 45 weight parts |

The resulting dope was cooled to 40° C., while the pressure was reduced to normal pressure. The dope set aside overnight, and was then subjected to a deforming process. Thereafter, the resulting solution was filtered, employing Azumi filter paper No. 244, manufactured by Azumi Roshi Co., Ltd. The resulting dope was cooled and maintained at 35° C., and was uniformly cast on a 6 m long endless rotating stainless steel belt (having an effective length of 5.5 m) which was mounted on two drums. The cast dope was dried for two minutes on the same stainless steel belt of which opposite surface was continually brought into contact with 15° C. water. The solvents were evaporated until the residual solvent amount reached 20 percent. Then peeling from the stainless steel belt was carried out under a peeling tension of 150 N/m. Subsequently, while holding both edges of the peeled film, drying was carried out at 130° C. Further, while conveyance was carried out under a conveyance tension of 130 N/m, employing numerous rolls, drying was further carried out. Thus Film No. 1, having a thickness of 120 μm, was obtained. Films No. 2 through No. 11 were prepared in the same manner as Film No. 1 except that cellulose elements, the added amounts and the types of solvents, plasticizers, residual solvent amount, and film thickness were varied as shown in Table 1. CAP represents cellulose acetate propionate of the present invention. The degree of acetyl substitution and propionyl substitution was between 1.5 and 2.1 and between 0.6 and 1.2, respectively. TAC represents cellulose triacetate with a degree of acetyl substitution of 2.8.

The resulting films were subjected to measurement and evaluation, employing the methods described below. Tables 1 and 2 show the results.

(Substitution Degree of Fatty Acid Cellulose Ester)

The substitution degree was measured-employing a saponification method. Dried cellulose ester was accurately weighed and dissolved in a mixed solvent consisting of acetone and dimethylsulfoxide (at a volume ratio of 4:1). Thereafter, a specified aqueous 1 mol/liter sodium hydroxide solution was added and saponification was carried out at 25° C. for two hours. Excess sodium hydroxide was titrated with 0.5 mol/liter sulfuric acid, employing phenolphthalein as the indicator. Further, blank tests were carried out employing the same method as above. Still further, the supernatant of the solution completing the titration was diluted, and the composition of organic acids was measured based on a common method employing an ion chromatograph. The substitution degree (in percent) was calculated employing the following:

$TA=(Q-P)\times F/(1,000\times W)$ $DSac=(162.14\times TA)/(1-42.14\times TA+(1-56.06\times TA)\times (AL/AC)$ $DSpr=DSac\times (AL/AC)$ wherein P is the volume (in ml) of 0.5 mol/liter sulfuric acid necessary for titrating a sample; Q (in ml) is the volume of 0.5 mol/liter sulfuric acid necessary for the blank test; F is the titer of 0.5 mol/liter sulfuric acid; W (in g) is the sample weight; TA (in mol/g) is the total organic acid amount; AL/AC is the mole ratio of acetic acid (AC) measured employing the ion chromatograph to other organic acids (AL); DSac is the degree of acetyl substitution; and DSpr is the degree of propionyl substitution.

(Number Average Molecular Weight of Fatty Acid Cellulose Ester)

Measurements were carried out under the conditions described below, employing a high speed liquid chromatography.

Solvent: methylene chloride
Column: MPW×1 (manufactured by Toso Co., Ltd.)
Sample concentration: 0.2 W/V percent
Flow rate: 1.0 ml/minute Injected sample volume: 300 ml Standard sample: polystyrene Temperature: 23° C.

(Residual Solvent Amount)

Residual solvent amount (in percent)=(M−N)N×100; wherein M is the weight of the film (the web) after winding, and N is the weight when M is dried at 110° C. for 3 hours.

(Retardation Value (Rt Value) in the Thickness Direction)

Employing an automatic double refractometer, KOBRA-21ADH, (manufactured by Oji Keisoku Kiki Co., Ltd.), 3-dimensional refractive indices were measured at a wavelength of 590 nm at 23° C. and at 55 percent relative humidity, and refractive indices $n_x$, $n_y$, and $n_z$ were obtained. The retardation value (Rt value) in the thickness direction was calculated employing Formula 1 described below.

Formula 1:

$$Rt\ \text{value} = [(n_x + n_y)/2 - n_z] \times d$$

wherein $n_x$ represents the refractive index of a film in the direction parallel to the film casting direction, $n_y$ represents the refractive index of a film in the direction perpendicular to the casting direction, $n_z$ represents the refractive index of the film in the thickness direction, and d (in nm) represent the thickness of a film.

(Retardation Value (Ro value) in the in-plane direction)

Employing an automatic double refractometer, KOBRA-21ADH, (manufactured by Oji Keisoku Kiki Co., Ltd.), three-dimensional refractive indices are measured at a wavelength of 590 nm at 23° C. and at 55 percent relative humidity, and refractive indices $n_x$ and $n_y$, are obtained. The retardation value (Ro) in the in-plane direction is calculated employing Formula 2 described below:

Formula 2:

$$Ro\ \text{value} = (n_{x-ny}) \times d;$$

wherein $n_x$ represents the refractive index of a film in the direction parallel to the film casting direction, $n_y$ represents the refractive index of a film in the direction perpendicular to the casting direction, and d (in nm) represent the thickness of the film.

TABLE 1

| Film No. | Component | Substitution Degree DSac/DSpr | Number Average Molecular Weight | Solvent Type and Added Amount (in weight parts) |
|---|---|---|---|---|
| 1 | CAP | 2.0/0.8 | approximately 100,000 | MA300 ET45 |
| 2 | CAP | 1.9/0.7 | approximately 90,000 | MA350 ET35 |
| 3 | CAP | 1.7/1.0 | approximately 100,000 | MA300 ET45 |
| 4 | CAP | 1.8/0.9 | approximately 120,000 | MA300 AC50 |
| 5 | TAC | 2.8/0.0 | approximately 100,000 | MC450 ET50 |
| 6 | CAP | 2.0/0.8 | approximately 100,000 | MA300 ET45 |
| 7 | CAP | 2.0/0.8 | approximately 100,000 | MA300 ET45 |

CAP: cellulose acetate propionate
TAC: cellulose triacetate
MA: methyl acetate
ET: methanol
MC: methylene chloride
AC: acetone

TABLE 2

| Film No. | Plasticizer (in weight parts) | Residual Solvent (in %) | Layer Thickness (in μm) | Rt | Ro | Remarks |
|---|---|---|---|---|---|---|
| 1 | EPEG 5 | 20 | 120 | 130 | 3 | invention |
| 2 | TPP 7 EPEG 3 | 15 | 120 | 160 | 4 | invention |
| 3 | EPEG 5 | 42 | 120 | 120 | 2 | invention |
| 4 | TPP 8 EPEG 2 | 65 | 120 | 110 | 4 | invention |
| 5 | TPP 15 | 80 | 120 | 55 | 10 | invention |
| 6 | EPEG 5 | 40 | 80 | 95 | 5 | comparative |
| 7 | EPEG 5 | 28 | 140 | 140 | 6 | invention |

EPEG: ethyl phthalyl ethyl glycolate
TPP: triphenyl phosphate

Example 2
(Preparation and Evaluation of Liquid Crystal Display)

Film No. 1 of Example 1 was treated with an aqueous 2.5 mol/liter sodium hydroxide solution at 40° C. for 60 seconds and subsequently washed with water for 3 minutes. Thus an alkali-treated film, in which a saponified layer was formed, was obtained.

Subsequently, a 120 μm thick polyvinyl alcohol film was immersed in 100 weight parts of an aqueous solution containing one weight part of iodine and 4 weight parts of boric acid, and then stretched to 4 times original length at 50° C. by a factor of 4 at 50° C. Thus a polarizing film was prepared. A polarizing plate was prepared by adhering said alkali-treated film onto both surfaces of the resulting polarizing film, employing a 5 percent aqueous totally saponified type polyvinyl alcohol solution as the adhesive. No. 1 Liquid Crystal Display was obtained by providing the resulting polarizing plate on both surfaces of a VA type liquid crystal cell.

Liquid Crystal Displays No. 2 through 11 were prepared in the same manner as above, employing Films No. 2 through 11 of Example 1.

These films were subjected to measurement and evaluation employing the methods described below. Table 3 shows the results.

(Viewing Angle Characteristics)

Each of the obtained liquid crystal displays was subjected to white display, black display, and 8-gradation gray display, employing a VG365N video pattern generator manufactured by AMT Co., Ltd. Then a contrast ratio during white/black display was measured in each angle of upper, lower, right, and left. An angle, which shows contrast ratio ≧10, was denoted as the viewing angle.

TABLE 3

| Liquid Crystal Display No. | Viewing Angle Properties (in degrees) | | | | General Evaluation |
|---|---|---|---|---|---|
| | Upper | Lower | Left | Right | |
| 1 | 72 | 55 | 65 | 60 | A |
| 2 | 74 | 59 | 65 | 65 | A |
| 3 | 72 | 57 | 63 | 62 | A |
| 4 | 70 | 55 | 60 | 60 | A |
| 5 | 45 | 40 | 45 | 40 | D |
| 6 | 60 | 50 | 62 | 62 | B |
| 7 | 72 | 57 | 63 | 63 | A |

As can be seen from Table 3, it was found that in the liquid crystal display, which employs cellulose ester film comprising a propionyl group, the Rt value was at least 60 nm and the viewing angle of said liquid crystal display increased. The films according to the invention are found to have wide viewing angle.

Example 3

(Evaluation of Fatty Acid Cellulose Ester Film)

Films No. 1, 5, and 6 were subjected to measurement and evaluation employing the methods described below. Table 4 shows the results.

(Transmittance)

Transmittance of light having a wavelength of 550 nm was measured employing a spectrophotometer (U-3400 manufatured by Hitachi Seisakusho).

(Moisture and Heat Resistance)

Two film sheets were prepared by blanking a film. A polyurethane adhesive was applied to one surface of the resulting film sheet. Then a polarizing film was prepared by adhering the resulting sheet onto both surfaces of a polarizing element (30 nm) comprised of polyvinyl alcohol and dichroic dyes. The thus obtained polarizing film was cut into 100×100 mm squares, and was adhered onto a glass plate, employing a acryl based adhesive, and stored at 80° C. and 90 percent relative humidity for 1,000 hours. Thereafter, the peeling state of said film was observed and the degree of coloration or chromaticity ("b" value) in the chromaticity diagram was determined.

(Tear Strength of Film)

The tear strength was measured in accordance with ASTM-D1, 992.

A 50×63.5 mm film sheet was subjected to 12.7 mm long cut along the center of the sheet in the width direction, and the tearing strength was measured at 23° C. and 55 percent relative humidity, employing a digital tearing tester manufactured by Toyo Seiki Seisakusho Co., Ltd.

(Dynamic Friction Coefficient)

The dynamic friction coefficient was measured in accordance with JIS-K-7125 (1987).

A 120×300 mm long film sheet was fixed on a supporting stand and an 80×200 mm film sheet was placed on it so that the surface and the opposite surface came into contact. Further, a 200 g dead weight was placed on them, which were horizontally pulled at a rate of 100 mm/minute. Force F necessary for the start of movement was determined.

Dynamic friction coefficient=F (in N)/weight of the dead weight (in N)

(Number of Foreign Matter Particles)

A sample was placed between two polarizing plates which were arranged in a polarized light cross Nicol state. Light was then applied to one surface of said polarizing plate. Employing a microscope, the number of foreign matter particles per 25 mm$^2$ at 10 arbitrary areas was measured which were observed as white spots due to the transmission of light on the other surface of said polarizing plate. Said measurement was repeated 5 times, and the averaged value was designated as the number of foreign matter particles. Employed as microscopic conditions were transmission light and a magnification factor of 30.

TABLE 4

| Film No. | Transmittance (in %) | Moisture and Heat Resistance Coloration Degree (in "b" value) | Tearing Strength (in g/sheet) | Dynamic Friction Coefficient | Number of Foreign Matter Particles | Classification |
|---|---|---|---|---|---|---|
| 1 | 92 | 0.23 | 46 | 0.9 | 66 | present invention |
| 4 | 91 | 0.25 | 50 | 0.8 | 120 | present invention |
| 5 | 91 | 0.38 cracking | 30 | 3.0 | 450 | comparative |

From Table 4, it was found that Samples No. 1 and No. 2 exhibited excellent properties for commercial use.

Example 4

In the example, the following methods of measurement as well as evaluation were employed.

<Substitution Degree of Fatty Acid Cellulose Esters>

The substitution degree was determined employing a saponification method. Dried cellulose ester was accurately weighed, and after dissolving said ester in a solvent mixture consisting of acetone and dimethyl sulfoxide (in a volume ratio of 4:1), 1N aqueous sodium hydroxide solution was added in an predetermined amount. Subsequently the resultant mixture underwent saponification at 25° C. for 2 hours. A phenolphthalein solution was added as the indicator and excess sodium hydroxide was titrated employing 1N sulfuric acid in addition, a blank test was carried out employing the same method as described above. Further, the supernatant of the solution, which had been subjected to titration, was diluted, and the composition of organic acids was determined according to the conventional method, employing ion chromatographs. Then substitution degree (in percent) was calculated by the following formula.

$$TA=(Q-P)\times F/(1,000\times W)$$

$$DSac=(162.24\times TA)/\{1-42.14\times TA+(1-56.06\times TA)\times (AL/AC)\}$$

$$DSpr=DSac\times (AL/AC)$$

wherein P represents the volume (in ml) of 1N sulfuric acid necessary for titrating a sample; Q represents the volume (in ml) of 1N sulfuric acid necessary for said blank test; F represents the titer of 1N sulfuric acid; W represents the weight of a sample; TA represent the total amount (in mol/g) of organic acids; AL/AC represents the mole ratio of acetic acid (AC) to the other organic acids (in this case, propionic acid) (AL), determined by the ion chromatograph); DSac represents the degree of acetyl substitution; and DSpr represents the degree of propionyl substitution.

<Number Average Molecular Weight of Cellulose Esters>

Measurement was carried out under the following conditions, employing a high-speed liquid chromatography.

Solvent: methylene chloride

Column: MPW×1 (manufactured by Toso Co., Ltd.)

Sample concentration: 0.2 weight/volume percent

Flow rate: 1.0 ml/minute

Injection volume of sample: 300 μl

Standard sample: polystyrene

Temperature: 23° C.

<Preparation of Cellulose Ester Film>

A composition was prepared as described below.

Composition (1)

| | |
|---|---|
| Cellulose acetate propionate (CAP) (the substitution degree as well as number average molecular weight is described in Table 4) | 120 weight parts |
| 2-(2'-Hydroxy-3',5'-di-tert-butylphenyl) benzotriazole (UV absorber) | 1 weight part |
| Ethyl phthalyl ethyl glycolate | 5 weight parts |
| Fine silica particles (Aerosil 200 having 0.016 μm, manufactured by Nihon Aerosil Co.) | 1 weight part |
| Methyl acetate | 300 weight parts |
| Ethanol | 45 weight parts |

Compositions (2) through (9) were prepared in the same manner as Composition (1), except that each of cellulose acetate propionate, ethyl phthalyl ethyl glycolate, and solvents of ethyl acetate as well as ethanol was varied as shown in Table 4.

Each of the aforementioned compositions was placed in a tightly sealed pressurized vessel; was heated to 80° C. under 5 atmospheric pressure; and was dissolved while stirring under said temperature. The dope was cooled to 40° C., and the pressure was decreased to normal atmospheric pressure. The resultant dope was put aside overnight. After defoaming operation, the resultant dope was filtered employing Azumi filter paper No. 244 under a filtration pressure of 16 kg/cm² (1.57 Mpa).

Subsequently, the resultant dope was cooled and maintained at 35° C., and was then uniformly cast onto a 6-meter long endless stainless steel belt (having an effective length of 5.5 m) which was mounted on two drums and was rotated. The cast dope was dried for two minutes on said stainless steel belt of which temperature was controlled in such a manner that the reverse side of said belt was brought into contact with water at 35° C., and subsequently was cooled on said belt on which the reverse side was brought into contact with water at 15° C. Thereafter, the solvent was evaporated until the peeling residual solvent amount reached the value in Table 2, and a resultant film was peeled from said stainless steel belt under a peeling tension of 150 Newton/m. Then the peeled film was dried at 130° C. while maintaining the film dimension at both edges. Thus, were obtained 80 μm thick Cellulose Ester Film Samples 101 through 109 and Cellulose Ester Film Samples 110 through 114 in which thickness and the like was varied.

The thickness of each film was measured employing a micrometer.

The retardation value (Rt value) of each film was shown in Table 2. Said retardation value (Rt value) was determined as described below.

<Retardation Value (Rt Value)>.

Employing an automatic double refractometer, KOBRA-21ADH (manufactured by Oji Keisokukiki Co., Ltd.), three-dimensional refractive indices were determined at a wavelength of 590 nm under an ambience of 23° C. and 55% RH, and thus refractive indices, nx, ny and nz, were obtained. The retardation value (Rt value) was calculated in accordance with the formula II described below.

Formula (II)

$$Rt \text{ value} = [(nx+ny)/2 - nz] \times d$$

wherein nx represents the refractive index of the film in the direction parallel to the film casting direction, and ny represents the refractive index of the film in the direction vertical to the film casting direction, while nz represents the refractive index in the thickness direction of said film; and d (in nm) represents the thickness of said film.

<Coating of Liquid Crystal Layer>

A gelatin layer (having a thickness of 0.1 μm) was applied onto each of transparent supports shown in Table 2, and then straight chain alkyl modified polyvinyl alcohol (MP203, manufactured by Kuraray Co., Ltd.) was further applied onto the resultant layer. After drying at 80° C. employing hot air, a rubbing treatment was carried out and an alignment layer was formed.

Employing a wire bar, onto the resultant alignment layer, applied was a coating composition prepared by dissolving 1.6 g of liquid crystallizing discotic compound LC-1, 0.4 g of phenoxydiethylene glycol acrylate (M101, manufactured by Toa Gosei Co., Ltd.), 0.05 g of cellulose acetate butyrate (CAB531-1, manufactured by Eastman Chemical Co.), 0.01 g of a photopolymerization initiator (Ilugacure 907, manufactured by Ciba-Geigy Co.) in 3.65 g of methyl ethyl ketone. The thickness of the liquid crystal layer was adjusted so as to satisfy the condition of Rt'/Rt in Table 5 wherein Rt represents the retardation value in the thickness direction of the liquid crystal layer, and Rt' is the retardation value in the thickness direction of the transparent support. Each of resultant coatings was fixed by adhering a metal flame and was heated for 3 minutes in a high temperature device at 130° C. so that the discotic compound was oriented. Subsequently, each sample in nitrogen gas was irradiated with radiation having an illuminance of 100 mW/cm² at 130° C. for 10 seconds, employing a high pressure mercury lamp, and the resultant orientation was fixed employing crosslinking reaction. The resultant sample was set aside and cooled to room temperature to form a liquid crystal layer comprising the discotic compound. Thus, optically anisotropic film samples were obtained for each of Cellulose Ester Film Samples 101 through 112. No liquid crystal layer was applied to Cellulose Ester Film Sample 113, which was only employed as the sample of the transparent support.

The thickness of a support, as well as a film coated with a liquid crystal layer described below, was measured employing a micrometer. The thickness of the liquid crystal layer was calculated based on differences in the thickness with the liquid crystal layer and without the liquid crystal layer.

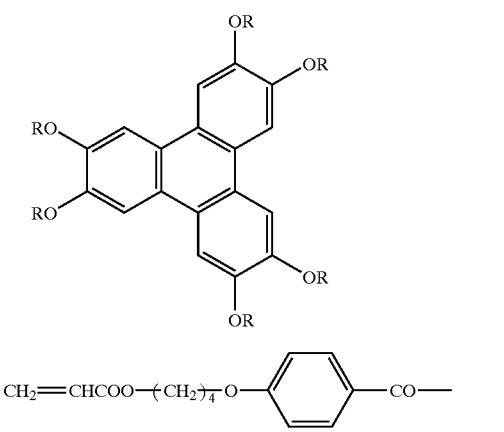

LC-1

<Preparation of Polarizing Plate>

Each of the resultant optically isotropic films was subjected to alkali treatment employing a 2.5N aqueous sodium hydroxide solution at 40° C. for 60 seconds, and washed for 3 minutes. Thus an alkali treated film was obtained.

Subsequently, a 120 μm thick polyvinyl alcohol film was immersed in 100 weight parts of an aqueous solution comprised of one weight part of iodine and 4 weight parts of boric acid, and subsequently was stretched 4 times. Thus a polarizing film was prepared. Said alkali treated sample film was adhered onto one side of the resultant polarizing film employing a 5 percent aqueous completely saponified type polyvinyl alcohol solution as the adhesive and further an 80 μm thick cellulose acetate film was subjected to alkali treatment in the same manner and adhered. Thus a polarizing plate sample was prepared.

<Evaluation of Viewing Angle>

The polarizing plate of an LA-1529HM type TFT-TN liquid crystal panel manufactured by NEC Corp. was peeled off, and the optical compensation film provided between said polarizing plate and the liquid crystal panel was also peeled off. The polarizing plate comprising each of optically anisotropic films, to which the liquid crystal layer shown in Table 2 was applied employing the aforementioned method, was provided so that the optically anisotropic film side is positioned between the polarizer and the liquid crystal panel and was then attached. The adhesion of this polarizing plate was carried out on both of the black light side and the image observing side with respect to the liquid crystal panel. For each sample, a monitor was driven employing a personal computer, and a contrast ratio during white/black display was measured employing an Ez-Contrast of ELDIM Co. Regarding upper and lower, and right and left, each angle of the liquid crystal panel having a contrast of at least 10 from the radial direction was measured and designated as the viewing angle. Three-grade evaluation was carried out based on the criteria shown below.

| Evaluation | Upper | Lower | Left | Right |
|---|---|---|---|---|
| C | below 30 degrees | below 35 degrees | below 45 degrees | below 45 degrees |
| B | 30 to 40 degrees | 35 to 40 degrees | 45 to 55 degrees | 45 to 55 degrees |
| A | 41 to 50 degrees | 41 to 50 degrees | 56 to 65 degrees | 56 to 65 degrees |

Viewing Angle 2

The polarizing plate of a VL-1530 liquid crystal panel manufactured by Fujitsu was peeled off. Employing the method described above, a polarizing plate comprising each optically isotropic film, into which the liquid crystal layer shown in Table 2 was applied, was provided so that the optically anisotropic film side was positioned between the polarizer and the liquid crystal panel, and was attached. The adhesion of the polarizing plate was carried out on both of the black light side and the image observing side. Further, employing the aforementioned viewing angle measurement method, substantial evaluation of the viewing angles at upper and lower as well as right and left was carried out.

| Evaluation | Upper | Lower | Left | Right |
|---|---|---|---|---|
| C | below 45 degrees | below 45 degrees | below 50 degrees | below 50 degrees |
| B | 45 to 55 degrees | 45 to 55 degrees | 50 to 60 degrees | 50 to 60 degrees |
| A | 56 degrees or more | 56 degrees or more | 61 degrees or more | 61 degrees or more |

<Number of Luminescent Spots>

A transparent support, which was employed for an optically anisotropic film, was placed between two polarizing plates arranged in the right angle with each other. Subsequently, light was irradiated onto one surface of the polarizing plate and the number of luminescent spots per 250 mm² of the opposite surface was determined employing a microscope. Determination was carried out for five randomly selected areas, and the average value was designated as the number of luminescent spots due to foreign matter particles.

At that time, a transmitted light source and a magnifying factor of 30 were employed as conditions using the microscope.

<Profitability>

Material ratio during the production of the optically anisotropic film was evaluated to be A, B, and C. Criteria were such that as the amount of liquid crystalline compounds decreases, profitability is improved.

TABLE 5

| Sample | Composition No. | Support Thickness in μm | Residual Solvent at Peeling in percent | RT Value in nm | Rt'/Rt |
|---|---|---|---|---|---|
| 101 | (1) | 80 | 19 | 86 | 0.74 |
| 102 | (2) | 80 | 11 | 106 | 0.41 |
| 103 | (3) | 80 | 40 | 80 | 0.88 |
| 104 | (4) | 80 | 65 | 74 | 1.04 |
| 105 | (5) | 80 | 65 | 72 | 1.08 |
| 106 | (6) | 80 | 76 | 33 | 3.5 |
| 107 | (7) | 80 | 110 | 57 | 1.63 |
| 108 | (8) | 80 | 75 | 31 | 3.84 |
| 109 | (1) | 120 | 41 | 120 | 0.25 |
| 110 | (2) | 120 | 45 | 114 | 0.32 |
| 111 | (6) | 120 | 70 | 36 | 3.17 |
| 112 | (7) | 190 | 71 | 95 | 0.58 |
| 113 | (8) | 80 | 75 | 31 | 0 |

| Sample | Profitability | Viewing Angle 1 | Viewing Angle 2 | Number of Luminescent Spots 5 to 50 μm | Number of Luminescent Spots 50 μm or more | |
|---|---|---|---|---|---|---|
| 101 | A | A | A | 43 | 0 | present invention |
| 102 | A | B | A | 39 | 0 | present invention |
| 103 | B | A | A | 49 | 0 | present invention |
| 104 | B | A | A | 52 | 0 | present invention |
| 105 | B | A | A | 89 | 0 | present invention |
| 106 | C | A | B | 305 | 5 | comparative |
| 107 | C | B | A | 320 | 16 | comparative |
| 108 | C | A | B | 362 | 2 | comparative |
| 109 | A | B | A | 71 | 0 | present invention |
| 110 | A | B | A | 62 | 0 | present invention |
| 111 | C | B | B | 478 | 7 | comparative |
| 112 | A | B | A | 853 | 31 | comparative |
| 113 | A | C | C | — | — | comparative |

As can clearly be seen from Table 5, the optically anisotropic films of the present invention exhibit excellent profitability associated with production as well as effects for enhancing the viewing angle. Further, liquid display is not adversely affected due to the minimized number of luminescent spots.

Comparative TAC has higher refractive index in the thickness direction. As a result, as the Rt value increases, the film thickness increases. Due to that, the number of luminescent spots increases to adversely affect the liquid crystal display. When the retardation value in the thickness direction is increased by applying a liquid crystal layer without increasing the film thickness, profitability decreases due to the fact that liquid crystalline compounds are more expensive than resins which structure the support.

Example 5

Samples were prepared in the same manner as Example 1, except that LC-2 instead of LC-1 was applied to the transparent support of Example 1 employing the method described below, and subsequently were evaluated.

Ten weight percent of a solution was prepared by dissolving 5 g of LC-2 in chloroform. This solution was applied employing a print method onto a 30×30 cm square polyimide film which had be subjected to rubbing treatment. Subsequently, the resultant coating was dried on a hot plate at 80° C. and was subjected to heat treatment at 230° C. for 20 minutes in an oven. Thereafter, the coating was removed from the oven and cooled to room temperature. First, LC-2 was oriented on the resultant polyimide film, and subsequently fixed. Next an ultraviolet hardening type adhesive was applied onto the resultant liquid crystal layer. Thereafter lamination was carried out employing each of transparent supports described in Table 2, and the adhesive was hardened by radiation of a high pressure mercury lamp. Next, the resultant polyimide film was peeled off and removed. The liquid crystal layer remained on the transparent support via the adhesive. The adhesion layer was optically isotropic.

Resultant samples were evaluated in the same manner as Example 4. The optically anisotropic films of the present invention exhibited the same effects as Example 4, compared to comparative examples.

Example 5

Samples were prepared in the same manner as Example 4, except that LC-3 instead of LC-1 was applied to the transparent support of Example 4, employing the method described below, and subsequently were evaluated.

Employing a wire bar, onto an alignment layer which was similar to Example 4, applied was a coating composition prepared by dissolving 1.6 g of LC-3, 0.4 g of phenoxydiethylene glycol acrylate (M101, manufactured by Toa Gosei Co., Ltd.), 0.01 g of a photopolymerization initiator (Ilugacure 907, manufactured by Ciba-Geigy Co.) in 3.65 g of methyl ethyl ketone. The thickness of the liquid crystal layer was adjusted so as to satisfy the condition of Rt'/Rt in the same manner as Table 2 of Example 1 wherein Rt represents the retardation value in the thickness direction of the liquid crystal layer, and Rt' is the retardation value in the thickness direction of the transparent support. Each of resultant coatings was fixed by adhering a metal flame and was heated for 3 minutes in a high temperature device at 130° C. so that the liquid crystalline compound was oriented. Subsequently, each sample in nitrogen gas was irradiated with radiation having an illuminance of 100 mW (500 mJ)/cm$^2$ at 120° C. for 10 seconds, employing a high pressure mercury lamp, and the resultant orientation was fixed employing crosslinking reaction. The resultant sample was set aside and cooled to room temperature to form an optically anisotropic film comprising LC-3.

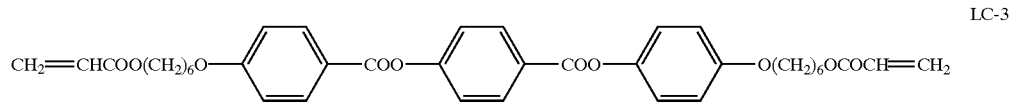

LC-3

The resultant samples were evaluated in the same manner as Example 4. The optically anisotropic films of the present invention exhibited the same effects as Example 4, compared to comparative examples.

It is possible to provide a film for a liquid crystal display which is capable of improving optically anisotropic performance, such as minimizing problems due to abnormal light emission, enhancement of a viewing angle without increasing of the thickness, and the like, and provide a polarizing plate as well as a liquid crystal display using the same. In addition, it is possible to provide a film for a liquid crystal display which is less expensive as well as thinner, while exhibiting higher tear strength as well as excellent water resistance, and provide a polarizing plate as well as a liquid crystal display using the same.

Disclosed embodiment can be varied by a skilled person without departing from the spirit and scope of the invention.

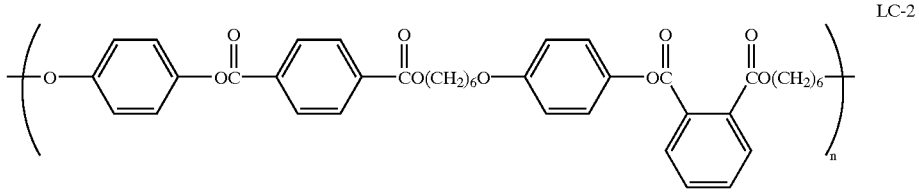

LC-2

What is claimed is:

1. An optically anisotropic film comprising:
   a support which contains a fatty acid cellulose ester having an acyl group including 2 or 3 carbon atoms, provided thereon an alignment layer and a liquid crystal layer,
   wherein the support has a relationship represented by Formula (1),
   a retardation value (Rt value) of the support represented by Formula (II) is 50 to 300 nm, the number of luminescent points having a size exceeding 50 μm the support observed in cross Nicole state is zero per 250 mm², and the number of luminescent points having a size of 5 to 50 μm of the support observed in cross Nicole state is 200 or less per 250 mm², Formula (I)

$$(nx+ny)/2-nz>0$$

Formula (II)

$$[(nx+ny)/2-nz] \times d$$

wherein nx represents the refractive index of the support in the direction giving maximum refractive index in the plane of the support, ny represents the refractive index of the support in the direction perpendicular to the direction giving maximum refractive index in the plane of the support, nz represents the refractive index of the support in the thickness direction and d represents the thickness (in nm) of the support.

2. The optically anisotropic film of claim 1 wherein the retardation value (Rt value) represented by the Formula (II) is from 60 to 250 nm.

3. The optically anisotropic film of claim 1 wherein the thickness of the film is from 40 to 150 μm.

4. The optically anisotropic film of claim 1 wherein the Rt ratio of the liquid crystal layer to the support represented by Formula 3 is 1.2 or less, Formula 3

$$Rt \text{ ratio } (Rt'/Rt).$$

5. The optically anisotropic film of claim 1 wherein the RT ratio of the liquid crystal layer to the support represented by Formula 4 is 1.2 or less, Formula (4)

$$Rt \text{ ratio}=(Rt'/Rt).$$

6. The optically anisotropic film of claim 1 wherein the liquid crystal mode is twist nematic mode or a vertical alignment mode.

7. The optically anisotropic film of claim 1 wherein the liquid crystalline compound constituting the liquid crystal layer is a monomer having a chemically reactive group and after being oriented on the alignment layer, said orientation is fixed while being hardened by light or heat.

8. The optically anisotropic film of claim 1 wherein a liquid crystalline compound constituting the liquid crystal layer is a discotic liquid crystal or a liquid crystalline polymer.

9. The optically anisotropic film of claim 1 wherein the number of luminescent points having a size of 5 to 50 μm of the support in cross Nicole state is 100 or less per 250 mm².

10. An optically anisotropic film comprising:
a support which contains a fatty acid cellulose ester having an acyl group including 2 or 3 carbon atoms, provided thereon an alignment layer and a liquid crystal layer,
wherein the support comprises fine particles having an average particle size of not more than 0.1 μm,
the support has a relationship represented by Formula (I),
a retardation value (Rt value) of the support represented by Formula (II) is 50 to 300 nm, the number of luminescent points having a size exceeding 50 μm of the support observed in cross Nicole state is zero per 250 mm² and the number of luminescent points having a size of 5 to 50 μm of the support observed in cross Nicole state is 200 or less per 250 mm², Formula (I)

$$(nx+ny)/2-nz>0$$

Formula (II)

$$[(nx+ny)/2-nz] \times d$$

wherein nx represents the refractive index of the support in the direction giving maximum refractive index in the plane of the support, ny represents the refractive index of the support in the direction perpendicular to the direction giving maximum refractive index in the plane of the support, nz represents the refractive index of the support in the thickness direction and d represents the thickness (in nm) of the support.

11. The optically anisotropic film of claim 10 wherein the retardation value (Rt value) represented by the Formula (II) is from 60 to 250 nm.

12. The optically anisotropic film of claim 1 wherein the thickness of the film is from 40 to 150 μm.

13. The optically anisotropic film of claim 10 wherein the Rt ratio of the liquid crystal layer to the support represented by Formula 3 is 1.2 or less, Formula 3

$$Rt \text{ ratio}=(Rt'/Rt).$$

14. The optically anisotropic film of claim 10 wherein the Rt ratio of the liquid crystal layer to the support represented by Formula 4 is 1.2 or less, Formula (4)

$$Rt \text{ ratio}=(Rt'/Rt).$$

15. The optically anisotropic film of claim 10 wherein the liquid crystal mode is twist nematic mode or a vertical alignment mode.

16. The optically anisotropic film of claim 10 wherein the liquid crystalline compound constituting the liquid crystal layer is a monomer having a chemically reactive group and after being oriented on the alignment layer, said orientation is fixed while being hardened by light or heat.

17. The optically anisotropic film of claim 10 wherein a liquid crystalline compound constituting the liquid crystal layer is a discotic liquid crystal or a liquid crystalline polymer.

18. The optically anisotropic film of claim 10 wherein the number of luminescent points having a size of 5 to 50 μm of the support in cross Nicole state is 100 or less per 250 mm².

19. A vertical alignment (VA) type liquid crystal display comprising a liquid crystal cell, a first optically anisotropic film provided on one said of the cell and a second optically anisotropic film provided on the other side of the cell,
wherein each of the first optically anisotropic film and the second optically anisotropic film comprises,
a support which contains a fatty acid cellulose ester having an acyl group including 2 or 3 carbon atoms, provided thereon an alignment layer and a liquid crystal layer,
the support has a relationship represented by Formula (I), a retardation value (Rt value) of the support represented by Formula (II) is 50 to 300 nm, the number of luminescent points having a size exceeding 50 μm of the support observed in cross Nicole state is zero per 250 mm² and the number of luminescent points having a size of 5 to 50 μm of the support observed in cross Nicole state is 200 or less per 250 mm², Formula (I)

$$(nx+ny)/2-nz > 0$$

Formula (II)

$$[(nx+ny)/2-nz] \times d$$

wherein nx represents the refractive index of the support in the direction giving maximum refractive index in the plane of the support, ny represents the refractive index of the support in the direction perpendicular to the direction giving maximum refractive index in the plane of the support, nz represents the refractive index of the support in the thickness direction and d represents the thickness (in nm) of the support.

20. The vertical alignment (VA) type liquid crystal display of claim 19 wherein the retardation value (Rt value) represented by the Formula (II) is from 60 to 250 nm.

21. The vertical alignment (VA) type liquid crystal display of claim 19 wherein the thickness of each of the films is from 40 to 150 μm.

22. The vertical alignment (VA) type liquid crystal display of claim 19 wherein the Rt ratio of the liquid crystal layer to the support represented by Formula 3 is 1.2 or less, Formula 3

$$Rt \text{ ratio} = (Rt'/Rt).$$

23. The vertical alignment (VA) type liquid crystal display of claim 19 wherein the Rt ratio of the liquid crystal layer to the support represented by Formula 4 is 1.2 or less, Formula (4)

$$Rt \text{ ratio} = (Rt'/Rt).$$

24. The vertical alignment (VA) type liquid crystal display of claim 19 wherein the liquid crystalline compound constituting the liquid crystal layer is a monomer having a chemically reactive group and after being oriented on the alignment layer, said orientation is fixed while being hardened by light or heat.

25. The vertical alignment (VA) type liquid crystal display of claim 19 wherein a liquid crystalline compound constituting the liquid crystal layer is a discotic liquid crystal or a liquid crystalline polymer.

26. The vertical alignment (VA) type liquid crystal display of claim 19 wherein the number of luminescent points in each of the supports having a size of 5 to 50 μm of the support in cross Nicole state is 100 or less per 250 mm².

27. The vertical alignment (VA) type liquid crystal display of claim 19 wherein each of the supports comprises fine particles having an average particle size of not more than 0.1 μm in an amount of 0.005 to 0.3 weight parts per 100 weight parts of the support.

* * * * *